(12) United States Patent
Peasley et al.

(10) Patent No.: US 11,803,869 B2
(45) Date of Patent: Oct. 31, 2023

(54) SYSTEMS AND METHODS FOR A TRUST-BASED REFERRAL SYSTEM UTILIZING A MOBILE DEVICE

(71) Applicant: Wired Avenue, San Diego, CA (US)

(72) Inventors: Josh Adam Peasley, Huntington Beach, CA (US); Shawnee Marie Hayes, Bend, OR (US); David Scott Smith, Seal Beach, CA (US); Devon Dominic Niccole, Huntington Beach, CA (US); Tony Stephen Sailer, Las Vegas, NV (US)

( * ) Notice: Subject to any disclaimer, the term of this patent is extended or adjusted under 35 U.S.C. 154(b) by 0 days.

(21) Appl. No.: 17/397,477

(22) Filed: Aug. 9, 2021

(65) Prior Publication Data

US 2021/0374792 A1 Dec. 2, 2021

Related U.S. Application Data

(63) Continuation of application No. 15/955,575, filed on Apr. 17, 2018, now Pat. No. 11,087,352.

(60) Provisional application No. 62/617,937, filed on Jan. 16, 2018, provisional application No. 62/486,786, filed on Apr. 18, 2017.

(51) Int. Cl.
*G06Q 30/00* (2023.01)
*G06Q 30/0207* (2023.01)
*G06Q 50/00* (2012.01)

(52) U.S. Cl.
CPC ..... *G06Q 30/0236* (2013.01); *G06Q 30/0239* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,177,839 B1* | 2/2007 | Claxton | G06Q 20/4016 705/44 |
| 2003/0079133 A1* | 4/2003 | Breiter | G06F 21/10 713/182 |
| 2006/0020508 A1* | 1/2006 | Gorti | G06Q 30/0269 705/14.66 |
| 2007/0271194 A1* | 11/2007 | Walker | G06Q 30/02 705/80 |
| 2009/0125429 A1* | 5/2009 | Takayama | G06Q 20/327 705/35 |
| 2010/0023412 A1* | 1/2010 | Kitagawa | G06Q 30/0601 705/26.1 |
| 2011/0131096 A1* | 6/2011 | Frew | G06Q 30/02 705/14.66 |

(Continued)

OTHER PUBLICATIONS

Avdyushkin; Secure Location Validation with Wi-Fi Geo-fencing and NFC; IEEE 2015; pp. 890-896; 2015.*

(Continued)

*Primary Examiner* — Radu Andrei
(74) *Attorney, Agent, or Firm* — Merle W Richman, III

(57) ABSTRACT

The referral system described herein can give users the ability to recommend a vendor (such as, e.g., a company or a service provider) to another user via electronic sharing of a dynamically generated code when one or more pre-established conditions have been met, such as when the vendor has submitted a qualifying offer to the referral system and the user is verified to have previously utilized the referral system to redeem a prior offer of the given vendor.

14 Claims, 24 Drawing Sheets

(56) References Cited

U.S. PATENT DOCUMENTS

| | | | | |
|---|---|---|---|---|
| 2013/0159072 | A1* | 6/2013 | Vadhri | G06Q 30/0215 |
| | | | | 705/14.1 |
| 2013/0318207 | A1* | 11/2013 | Dotter | G06F 11/1469 |
| | | | | 709/219 |
| 2013/0346221 | A1* | 12/2013 | Rangachari | G06Q 30/0277 |
| | | | | 705/14.73 |
| 2014/0074569 | A1* | 3/2014 | Francis | G06Q 20/204 |
| | | | | 705/14.3 |
| 2014/0074617 | A1* | 3/2014 | Mukherji | G06Q 30/0267 |
| | | | | 705/346 |
| 2014/0365305 | A1* | 12/2014 | Arditi | G06Q 30/0261 |
| | | | | 705/14.58 |
| 2015/0200981 | A1* | 7/2015 | Garrick | H04L 67/52 |
| | | | | 709/204 |
| 2015/0242764 | A1* | 8/2015 | Subbaraj | H04L 67/56 |
| | | | | 705/5 |
| 2015/0254704 | A1* | 9/2015 | Kothe | G06Q 30/0261 |
| | | | | 705/14.26 |
| 2017/0064402 | A1* | 3/2017 | Killoran, Jr | H04N 21/4784 |
| 2017/0098211 | A1* | 4/2017 | Killoran, Jr | G06Q 20/387 |
| 2019/0287069 | A1* | 9/2019 | Kassemi | G06Q 40/00 |

OTHER PUBLICATIONS

Indu; A stand-alone and SMS-based approach for authentication using mobile phone; Engg College 2007; 6 pages; 2007.*

Avdyushkin; Secure Location Validation with Wi-Fi Geo-fencing and NFC; 2015 IEEE; pp. 890-896; 2015.

Indu; A Stand-Alone and SMS-Based Approach for Authentication Using Mobile Phone; IEEE Xplore.

* cited by examiner

SYSTEMS AND METHODS FOR A TRUST-BASED REFERRAL SYSTEM UTILIZING A MOBILE DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application Ser. Nos. 62/486,786 and 62/617,937, each entitled "Systems and Methods for a Trust-Based Referral System Utilizing a Mobile Device," filed Apr. 18, 2017 and Jan. 16, 2018, respectively, and which are hereby incorporated by reference in their entirety.

BACKGROUND OF THE INVENTION

Many existing vendor referral methods that utilize the Internet often do so in a manner that allows users to freely share electronic coupons or offers with others, or provide discount codes that can be shared by a user regardless of whether the user has actual experience with the given vendor. Some Internet-based referral systems also allow users to share offers related to a variety of merchants in exchange for some referral fees or other fees from the merchants. These Internet-based referral systems, however, do not have a mechanism for checking whether a user sharing the offer (such as, e.g., a promoter) does so because he is financially driven or because he truly enjoys the interactions with the vendor. As a result, a user receiving a referral is often uncertain as to whether the referral is trustworthy.

Throughout the drawings, reference numbers may be re-used to indicate correspondence between referenced elements. The drawings are provided to illustrate example embodiments described herein and are not intended to limit the scope of the disclosure.

DETAILED DESCRIPTION OF VARIOUS EMBODIMENTS

Overview

As described herein, existing referral systems lack a mechanism to ensure that the referrals provided to users are based on actual experience with vendors (rather than based on financial or other motivations). To solve this problem (among other problems), the disclosure herein provides a referral system which includes a computer-implemented mechanism for automatically linking a user with a vendor after the user has transacted at the vendor. Advantageously, in certain embodiments, the referral system verifies whether the user has been linked to the vendor in the system before the user is allowed to share the vendor's offers.

The referral system described herein can give users the ability to recommend a vendor (such as, e.g., a company or a service provider) to another user via electronic sharing of a dynamically generated code when one or more pre-established conditions have been met, such as when the vendor has submitted a qualifying offer to the referral system and the user is verified to have previously utilized the referral system to redeem a prior offer of the given vendor. For example, a user can access a mobile application of the referral system which can list offers that are recommended by other users (also referred to as promoters). Advantageously, in certain embodiments, promoters can only refer a vendor (or recommend an offer from the vendor) if the promoter has actually tried the vendor, which can give confidence to the users of the referral system that the recommendations are reliable. The offer may be associated with a code which can encrypt information of the offer and the promoter sharing the offer. When a user selects an offer, the user's mobile application can present the code to the vendor. After the offer is successfully redeemed, the promoter may receive a portion of the proceeds from the transaction between the user and the vendor. In certain embodiments, the user may automatically become eligible to be a promoter of the vendor after the user has redeemed the offer associated with the vendor. Details of the referral system according to certain embodiments are described below.

Example Computing Environments of a Referral System

Figure 1:
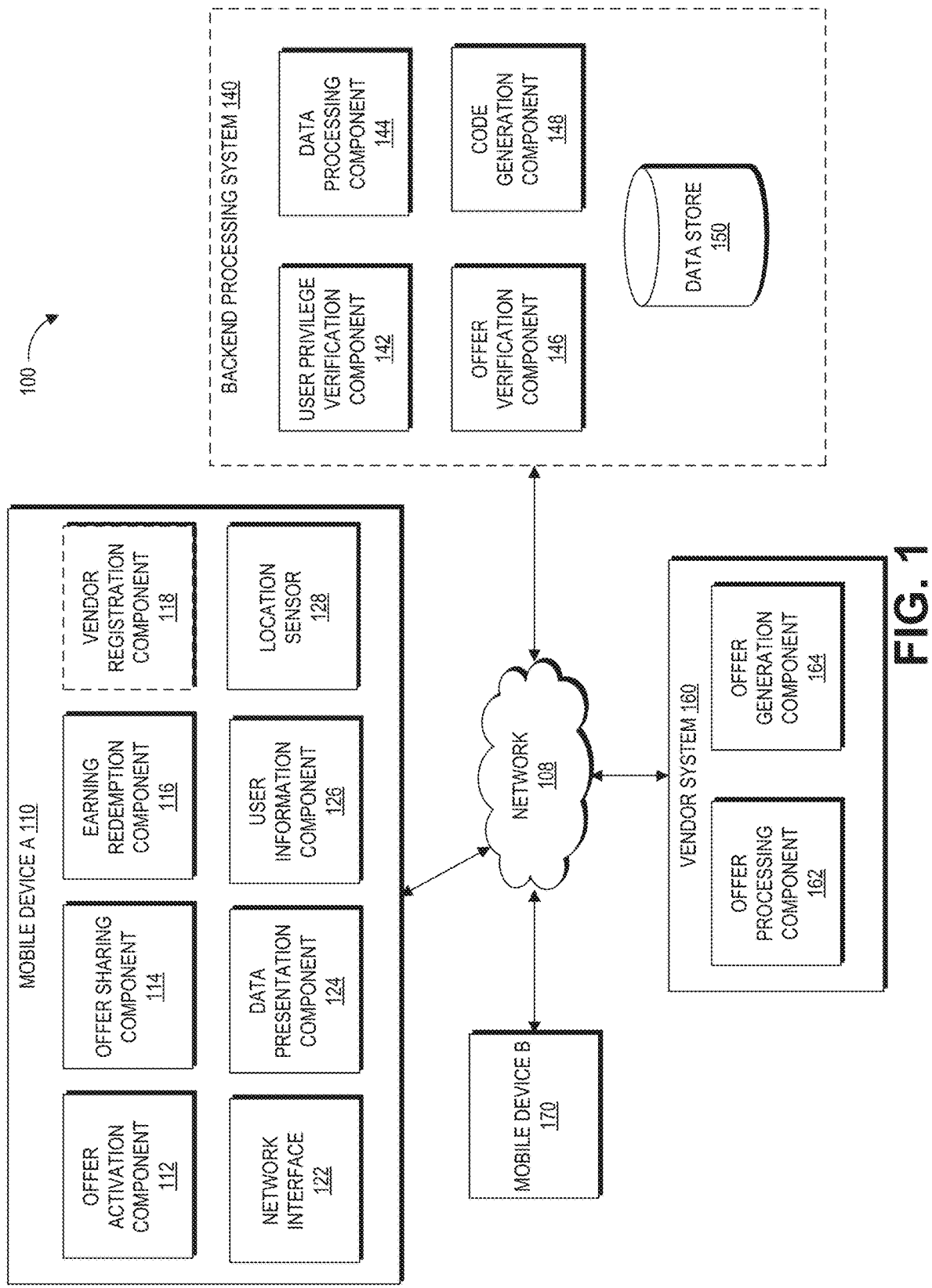
FIG. 1 illustrates an example computing environment of a referral system.

FIG. 1 illustrates an example computing environment of a referral system. In the example computing environment 100, the mobile device A 110, the mobile device B 170, the backend processing system 140, and the vendor system 160 can communicate via a network 108. The network 108 may be the Internet, a LAN, a WAN, a peer-to-peer network, radio frequency, Bluetooth, Wi-Fi, a cloud based network, a cellular network, or any other type of communication network. The mobile devices 110 and 170 can execute one or more mobile applications, such as, e.g., a referral application associated with the referral system. The mobile devices may include a standard browser application, such as a web browser, that can be executed on a mobile device in order to view web pages or other Internet-accessible content. As will be discussed below, depending on the embodiment, the user may use either the referral application (which the user may install on the mobile device before use) or a traditional browser application that is preinstalled on a typical mobile device or integrated with an operating system of the mobile device. In some embodiments, the mobile devices 110 and 170 can share one or more offers with each other using the respective referral application operating on each device, either directly over the network 108 or via the backend processing system 140, depending on the embodiment. The mobile devices 110 and 170 can present the offer to a vendor system for application to a purchase, such as by the vendor system capturing an image of a graphical code with a camera device or scanning a code with an optical scanner device. The backend processing system 140 can communicate with the mobile devices 110 and 170, as well as the vendor system 160 for sharing and applying the offer. To simplify discussion and not to limit the present disclosure, FIG. 1 illustrates only backend processing system 140, one vendor system 160, and two mobile devices (mobile device A 110 and mobile device B 170), though multiple systems and/or devices may be used.

Example Components of a Mobile Device

The mobile device A 110 can include various components, such as, e.g., an offer activation component 112, an offer sharing component 114, an earning redemption component 116, a vendor registration component 118, a network interface 122, a data presentation component 124, a user information component 126, and a location sensor 128. One or more of these components may be part of a referral application executed by the mobile device A 110. The referral application may be associated with a user's account. For example, the types of offers available for a given user may be different based on the user's account information such as the account's past activities with a vendor.

These example components of the mobile device A 110 are not intended to be limiting. The mobile device A 110 may include fewer or more components than described. For example, in some embodiments, the mobile device A 110 may not have a vendor registration component 118. In other embodiments, the mobile device A 110 may include more components and/or functionalities that facilitate the referrals of offers. For example, it will be appreciated by one of ordinary skill in the art that certain functionality may be performed by either a mobile device or a backend processing system with which the mobile device communicates over a network, where either implementation choice may result in providing similar or identical features to a user of the mobile device.

The offer activation component 112 of the mobile device A 110 can be configured to redeem an offer. For example, when a user logs into his account of the referral application, the offer activation components may identify a list of available offers that a user can redeem. The offers may be shared by another user's account or be provided by a vendor to encourage the user to visit the vendor and redeem the offers. Advantageously, in some embodiments, when a user first signs up for the referral application, the referral application can automatically generate one or more offers for the user to start immediately rather than to wait until the user's friend or other connection within the referral application shares an offer. The user can also ask other users for recommendations. For example, when a user visits a city, the user can ask his social network connections for recommendations of companies and service providers near the user's location. In certain implementations, the social network connections may only be able to refer a vendor (or forward offers associated with the vendor) if the social network connections have actually been to the vendor's location or have used a previous offer of the vendor.

The user can select an offer for redemption at a vendor from a list of available offers. When the mobile device A 110 detects that the user has selected the offer, the mobile device A 110 can present a code associated with the offer. The code with may be a graphical code of some type (such as e.g., a Quick Response® (QR) code, a two-dimensional (2D) bar code), or an alphanumeric string, depending on the embodiment. As further described herein, the code may encrypt or otherwise be associated with user information such as, e.g., a user account identifier (ID), a user ID, etc., offer information such as, e.g., a vendor ID (or other entity identifier that identifies an entity from which the offer is redeemable), an offer ID, parameters of the offer (e.g., a percentage of discount for a purchase), etc., alone or in combination. In certain embodiments, the code may be used by a computing system to look up offer information in the data store 150 or in a data store associated with the vendor system 160. For example, the code may be an alphanumeric string. Based on the alphanumeric string, the backend processing system 140 or the vendor system 160 can look up the offer information associated with the alphanumeric string. In other embodiments, an account identifier, vendor identifier, and/or one or more other pieces of information associated with the code may be extracted or decrypted from the code itself without reference to a lookup table.

As further described with reference to the vendor system 160, the vendor system 160 can include an optical scanner which can scan the code presented by the mobile device A 110. The vendor system 160 (or the backend processing system 140) can extract offer information based on the scanned code. In one embodiment, once the offer has been applied, the mobile device A 110, the vendor system 160, or the backend processing system 140 can mark the offer as activated such that the user cannot use the offer again at the same vendor. The backend processing system 140 or the vendor system 160 may automatically associate the user ID to the vendor ID such that the user can automatically access other offers provided by the vendor system 160, including future offers, for sharing with other users. In certain implementations, once a user has redeemed an offer associated with the vendor, the user cannot apply other offers provided by the same vendor.

Once the user has redeemed the offer, the mobile device A 110 can enable the user to share the offer with other users (such as, e.g., the user associated with the mobile device B 170). The offer sharing component 114 can enable a user to share an offer with another user. Advantageously, in some embodiments, the user can only share an offer of a vendor if the user has used the offer from the same vendor. In other embodiments, once the user has used an offer at the vendor, the user can have access to other offers from the same vendor and share the offers (including the ones that the user has not used) with other users.

As an example of sharing an offer with another user, if a user of the mobile device A 110 wants to share an offer with the user of the mobile device B 170, the user of the mobile device A 110 can input the other user's information such as the other user's name, email address, phone number, as well as a message to the other user into the referral application. The offer sharing component 114 can communicate the other user's information to the backend processing system 140. The backend processing system 140 can determine whether it is the user's first time sharing the offer. If the user has not shared the offer before, the backend processing system 140 can generate a code associated with the offer where the code can encrypt the user's information as well as the offer information, or may generate a code that the system associates with the user's information in a data store without encrypting any user information within the code itself. If the user has previously shared the offer, the backend processing system 140 can access the code associated with the offer stored in the data store 150 based on the user's information and the offer information. The backend processing system 140 can pass the code to the mobile device B 170, either utilizing push technology in real time or waiting for a request from the mobile device B 170 when the user of mobile device B next launches the application. The offer activation component of the mobile device B 170 can retrieve the offer information including the discounts and pictures associated with the products in the offer and display the offer information on the mobile device B.

When the user of the mobile device B 170 redeems the offer, the user of the mobile device A 110 (e.g., a promoter) can receive a portion of the proceeds from the purchase by the user of the mobile device B 170. For example, the backend processing system 140 can identify the user ID of the promoter (e.g., the user of the mobile device A 110) based on the code associated with the offer. The backend processing system 140 can then pass a percentage of the proceeds received from the vendor system 160 (due to the transaction between the vendor system and the mobile device B) to the user of the mobile device A 110. In other embodiments, compensation may be of a set amount (as opposed to a portion or percentage), and/or may be in a non-monetary form, such as points that may be redeemed for products or services via the backend processing system or a third-party service.

In certain implementations, the user of the mobile device A 110 can get compensated when the user of the mobile device B 170 "checks in" at a location of a vendor or other entity offering a referral code (rather than when the user of the mobile device B 170 makes an actual purchase). For example, a doctor may provide a monetary incentive to his patient for promotion of the doctor's service. The doctor can give the patient a voucher that the patient can share with other patients via functionality described herein. The patient can use the offer sharing component 114 to pass the voucher to other potential patients. Once one of the other potential patients checks in at that doctor's office, the patient sharing the voucher may automatically receive compensation for sharing the voucher even if the referred individual does not actually become a patient of the doctor's office (e.g., if the individual simply has an initial consultation with the doctor free of charge). Depending on the embodiment, the backend processing system 140's determination that a given referred individual has "checked in" at the doctor's office or another location of an entity offering a referral code may be by receiving a check-in indication from a vendor system (e.g., a system operated by the doctor's office) and/or by receiving a check-in indication from the mobile device of the referred individual (e.g., by the user selecting to check in at the doctor's office location within a mobile application operating on the user's mobile device, where the device's geographic location is confirmed to match the geographic location of the office at the time of check in by GPS or similar geographic location functionality of the mobile device).

Optionally, the mobile device A 110 may include a vendor registration component 118. The vendor registration component 118 can be configured to enable registration of a vendor with the offer service described herein, such that the vendor may provide offers through the service. For example, a user operating on behalf of the vendor may input the name of a vendor, the types of goods/services offered by the vendor, the offers provided by the vendors, the location of vendor, etc., into the referral application using the vendor registration component 118. Upon the input, the backend processing system 140 can add the vendor's information into the data store 150. In some embodiments, the backend processing system 140 can communicate with the newly registered vendor to verify the information and obtain authorization to share the vouchers via the referral application. In some embodiments, an individual vendor may refer or invite another vendor to register with the offer service to distribute offers via the service, in which case the referring vendor may receive commission or other referral incentives in certain embodiments.

The mobile device A 110 can include the network interface 122 configured to communicate with other computing devices or systems, such as, e.g., the mobile device B 170, the vendor system 160, and the backend processing system 140, via the network 108. The mobile device A 110 can also include a data presentation component 124. The data presentation component 124 can communicate with the other components of the mobile device 110, the vendor system 160, the backend processing system 140, or the mobile device B 170 to generate various user interfaces, such as the example user interfaces shown in FIGS. 6A-10C. The data presentation component 124 can include three user interface pages, which may generally be titled or referred to as "use it", "share it", and "earn it". For example, the page "use it" can correspond to functions provided by the offer activation component 112; the page "share it" can correspond to functions provided by the offer sharing component 114; and the page "earn it" can correspond to functions provided by the earning redemption component 116.

The mobile device A 110 can also include a user information component 126. The user information component 126 can manage a user's account information, such as, e.g., login information, the user's demographic information, preferences, locations, etc. For example, the user information component 126 can include a user's profile showing the user's account ID, the user's current location, and the types of services/goods that the user is interested in. The offer activation component 112 can present offers based on the user's profile. For example, the offer activation component 112 can present a list of available offers that are within a certain distance from the user's location even though the user's connections have also shared offers in other geographical regions. As another example, a user may be interested in fast food restaurants. As a result, the offer activation component 112 may present offers related to fast food restaurants rather than electronics stores.

The mobile device A 110 can use a location sensor 128 to detect a user's current position. The location sensor 128 can include a global positioning system (GPS), an accelerometer, a gyroscope, etc., for measuring the user's movement and position. Data acquired by the location sensors may be used by other components of the mobile device A (or the backend processing system 140) for presenting offers to the user.

Although the data presentation component 124 and the user information component 126 are described as separate components, in some embodiments one or more of these components may be part of the offer activation component 112, the offer sharing component 114, or the earning redemption component 116. Furthermore, although the example components in FIG. 1 are described with reference to mobile device A 110, the mobile device B 170 can also include similar components.

Example Components of a Backend Processing System

The example backend processing system 140 can include a user privilege verification component 142, a data processing component 144, an offer verification component 146, a code generation component 148, and a data store 150. In various embodiments, the backend processing system 140 may include more or fewer components. For example, the user privilege verification component 142, the offer verification component 146, and the code generation component 148 may be part of the data processing component 144.

The user privilege verification component 142 can be configured to verify the user's account information. For example, the user privilege verification component 142 can determine whether the user's password and username are correctly associated with an account ID. The user privilege verification component 142 can also determine whether a user can share an offer with another user. Advantageously, in certain embodiments, a user can share an offer only if the user has visited the vendor providing the offer. Once the user has conducted a transaction with the vendor, the user's account ID may become linked to a vendor ID by associating the identifiers in a data store. The user privilege verification component 142 can look up the vendor ID in the data store 150 and determine whether the user's account ID is on a list of user IDs associated with a certain vendor ID. If the user's account ID is on the list, then the user has the privilege to share the offer. Otherwise, the user may not share the offer, in certain embodiments.

The data processing component 144 can be configured to process the user's information, the offer information, the vendor information, as well as to communicate with other computing devices/systems such as, e.g., the mobile device A 110, the mobile device B 170, and the vendor system 160. For example, the data processing component 144 can receive a new offer from the vendor system 160. The new offer may include parameters such as, e.g., the product/service to which a discount will apply, the percentage of the discount, the duration of the discount, as well as eligible users (such as, e.g., whether a user is a new customer or an existing customer). The data processing component 144 can communicate the new offer to mobile device A 110 and the mobile device B 170 and store the new offer in the data store 150. As another example, the data processing component 144 can link a vendor ID with a user account ID after the user has transacted with the vendor. Accordingly, the user can receive and share other offers associated with the vendor. As yet another example, the data processing component 144 can also associate a user account ID with an offer ID. Thereafter, the user cannot apply the offer again, in certain embodiments. However, the user can become a promoter of the offer and share the offer with other users.

The offer verification component 146 is configured to determine whether an offer is valid. For example, when a user presents a code of the offer at the vendor system 160, the vendor system 160 can communicate the code to the offer verification component 146. The offer verification component 146 can decrypt the code to extract the offer information and the promoter's information. Based on the extracted information, the offer verification component 146 can determine whether the offer is a legitimate offer. For example, the offer verification component 146 can determine whether the discount percentage is correct or whether the offer is still within a valid period of time. As another example, the vendor system 160 can decrypt the code and communicated the information from the decryption to the backend processing system 140 for verification. For example, the vendor system 160 can communicate an offer ID to the offer verification component 146. The offer verification component 146 can use the offer ID to retrieve the offer information from the data store 150 and to determine whether the offer presented by the user is valid.

In some embodiments, the offer verification component 146 together with the data processing component 144 can process a transaction between a user and a vendor system 160. For example, once the offer verification component 146 determines that the offer is valid, the offer verification component 146 can inform the vendor system 160 to proceed with the transaction. The vendor system 160, upon completing the transaction, will inform the backend processing system that the transaction is successful. The data processing component 144 of the backend processing system 140 can accordingly update an account balance of the promoter (who shared the offer with the user) to reflect a commission fee. The commission fee may be a portion of the vendor's earnings in the transaction between the user (who received the offer) and the vendor. The vendor system 160 may wire the portion of the vendor's earnings into a deposit account associated with the backend processing system 140. The data processing system 144 can update the account balance of the promoter by distributing the portion of the vendor's earnings from the deposit account into the account of the promoter. As further described with reference to the vendor system 160, in certain embodiments, the vendor system 160 can automatically update the account balance of the promoter to reflect the commission fee (for example by directly depositing into the promoter's account), rather than having the backend processing system 140 update the promoter's account balance.

The code generation component 148 of the backend processing system 140 can be configured to generate a code associated with an offer and a user who promotes the offer. Accordingly, an offer may be associated with multiple codes since there may be more than one user who shares the code with other users. As described with reference to mobile device A 110, a given code may encrypt a specific user's information as well as the offer information or may include an alphanumeric string which can be linked to the offer and the user in the data store 150.

The data store 150 can be configured to store user information, offer information, and vendor information. For example, the data store 150 can store the user IDs that are linked to a vendor ID. The data store 150 can also store the discount information, duration of discount, products/services which the discount applies, etc.

Example Components of a Vendor System

The vendor system 160 can include an offer processing component 162 and an offer generation component 164, although in certain embodiments, the vendor system 160 can include more or fewer components.

The offer processing component 162 can be configured to process an offer presented by a user. For example, the offer processing component 162 can include an optical scanner, such as, e.g., a camera of a mobile device. When a user presents a code to the vendor system 160, such as by holding a mobile device that presents a graphical code on its display screen, the offer processing component 162 can take an image of the code and extract information encrypted in the code. In certain embodiments, the offer processing component 162 can pass the code or the extracted information to the backend processing system 140 to determine whether the code or the offer associated with the code is valid. In other embodiments, the offer processing component 162 can determine whether the code or the offer associated with the code is valid. The offer processing component 162 can communicate with other components of the vendor system 160, such as a transaction processing component (not shown in FIG. 1) to determine whether to proceed with a transaction or whether to apply the offer to the transaction.

Once the transaction is completed, the offer processing component 162 can identify a commission fee to be paid to a promoter who shared the offer with the user. For example, the commission fee may be a percentage of the vendor's earnings from the transaction between the vendor and the user. To deposit the commission fee into the promoter's account, the offer processing system 162 can obtain the promoter's information by communicating with the backend processing system 140. For example, the offer processing system 162 can communicate information extracted from the code to the backend processing system 140 to look up the promoter's user ID. In certain implementations, where the code is a graphical code which encodes the promoter's information, the offer processing component 162 can extract the promoter's information directly from the graphical code without needing to communicate with the backend processing system 140. Based on the promoter's information (such as, e.g., the user ID or account number), the offer processing component can transfer (such as, e.g., via wire transfer) the commission fee into the promoter's account.

The offer generation component 164 can communicate with the backend processing system 140 to pass a new offer to the backend processing system 140. For example, a vendor can configure the parameters of an offer, such as, e.g., the product/service to which a discount will apply, the percentage of the discount, the duration of the discount, group of users that the offers will be provided to, etc. The offer generation component 164 can pass the parameters of the offer to the backend processing system 140. The backend processing system 140 can generate an offer ID which is associated with the vendor (e.g., the vendor ID) and the parameters of the offer.

Example Data Flows of a Referral System

Figure 2:
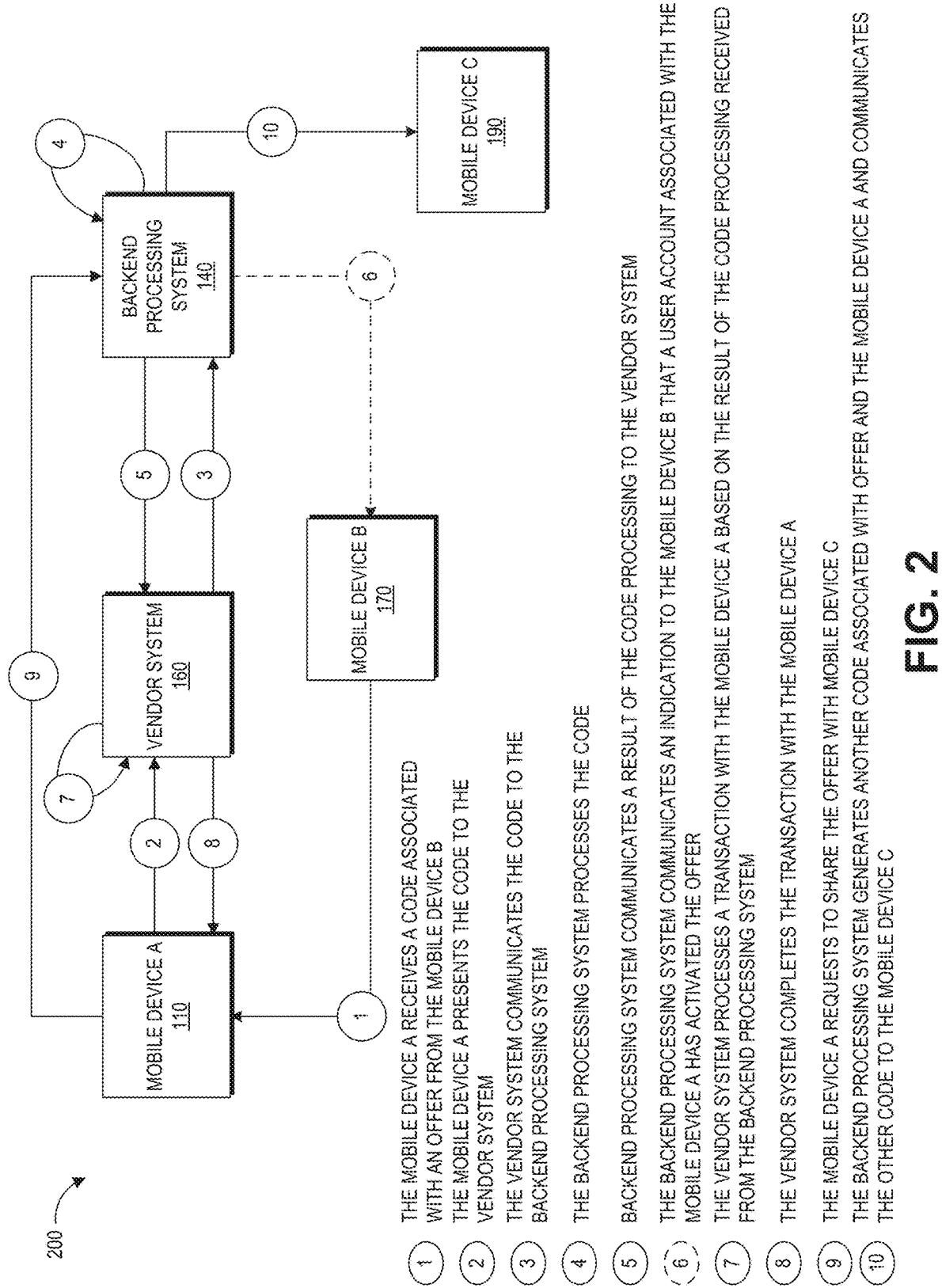
FIG. 2 illustrates an example dataflow of the referral system.

FIG. 2 illustrates an example dataflow of a referral system. The example dataflow 200 may be implemented in the computing environment 100. The example dataflow 200 includes interactions among mobile devices (e.g., mobile device A 110, mobile device B 170, and mobile device C 190), the vendor system 160, and the backend processing system 140.

At (1), the mobile device A 110 can receive a code associated with an offer from the mobile device B 170. The user of the mobile device B 170 may have previously used the offer or have been to the vendor associated with the offer. The user of the mobile device B 170 can promote the vendor by passing a code associated with the offer to the user account on mobile device A. The code may be linked to the user of the mobile device B 170 and the offer information. In certain embodiments, rather than receiving the code from the mobile device B 170, the mobile device A 110 can receive the code from the backend processing system 140 when the user of the mobile device B 170 chooses to share the offer with the user of the mobile device A.

At (2), the mobile device A 110 presents the code to the vendor system. For example, when a user of the mobile device A 110 selects the offer, the mobile device A 110 (such as, e.g., the data presentation component 124) can present the code associated with the offer on the mobile device A 110. The vendor system 160 can scan the code to apply the offer to a transaction between the user and the vendor.

At (3), the vendor system 160 communicates the code to the backend processing system. For example, the vendor system 160 can decrypt the code to identify the user account which shared the offer as well as to identify the offer information. As another example, the vendor system 160 can pass the code directly to the backend processing system without decrypting the code.

At (4), the backend processing system 140 processes the code. For example, the backend processing system 140 can access offer information to verify that the offer is valid. The backend processing system 140 can also assess whether the user who shared the offer qualifies as a promoter. For example, the backend processing system 140 can determine whether the user has visited the vendor before by checking the user ID against a list of user ID associated with the vendor ID.

At (5), the backend processing system 140 can communicate a result of the code processing to the vendor system 160. For example, the backend processing system 140 can communicate to the vendor system 160 whether the code is associated with a valid offer or whether the offer has expired. As another example, the backend processing system 140 can look up the user account ID associated with the mobile device A 110 to determine whether the user has previously applied the offer. As an example, the user of the mobile device A 110 can receive the same offer from multiple people. However, the user of the mobile device A 110 can only apply the offer once. In some embodiments, the backend processing system 140 can look up the user account ID in the data store 150 to determine whether the user account ID has already been associated with the offer ID or the vendor ID. In response to a determination that the user account ID has already been associated with the offer ID or the vendor ID, the backend processing system 140 may provide an indication to the vendor system 160 to prevent the user to apply the offer again.

At (6), the backend processing system 140 can optionally communicate an indication to the mobile device B 170 that a user account associated with the mobile device A 110 has activated the offer. For example, the backend processing system 140 can communicate a message via a text message or a referral application installed on the mobile device B 170 (such as via a push notification) indicating that the offer shared by the mobile device B has been used by a recipient (e.g., the user of the mobile device A 110). The backend processing system 140 can also communicate the amount of proceeds that are received by the user of the mobile device B due to the transaction between the user of the mobile device A and the vendor system 160. In certain embodiments, rather than informing the mobile device B 170 of the proceeds as the transaction is occurring between the mobile device A 110 and the vendor system 160, the backend processing system 140 can deposit the proceeds into the user's account. When the user of the mobile device B 170 logs onto the referral application, the backend processing system 140 can automatically present the amount of proceeds received as well as the account balance change due to the transaction between the mobile device A 110 and the vendor system 160.

At (7), the vendor system 160 can process the transaction with the mobile device A 110 based on the result of the code processing received from the backend processing system 140. For example, if the backend processing system 140 determines that the code or the offer is invalid or the user of the mobile device A 110 has previously used the offer, the vendor system 160 may proceed with the transaction without applying the offer. On the other hand, if the backend processing system 140 determines that the code or the offer is valid or it is the first time that the user uses the offer (or that the user visits the vendor), the vendor system 160 can automatically apply the offer to the transaction.

At (8), the vendor system 160 can communicate with the mobile device A 110 indicating that the transaction has been completed. Once the transaction has been completed, the mobile device A 110 may become a promoter of the offer. For example, if the user of the mobile device A 110 has never visited the vendor before, the user may automatically become a promoter of vendor upon redeeming an offer at the vendor. Accordingly, the user can share this offer and/or other offers associated with the vendor system 160.

At (9), the user can actuate the mobile device A 110 so that the mobile device A 110 can send a request to the backend processing system 140 to share the offer with the mobile device C. The backend processing system 140 can generate another code associated with the offer and the user of the mobile device A 110. This code may be different from the code that the user of the mobile device A 110 received from the user of the mobile device B 170 because the promoter is different in the two codes. The backend processing system 140 can pass the code to the mobile device C 190 at (10) so that the user of the mobile device C 190 can apply the code.

In some situations, the mobile device C 190 may receive the same offer from multiple users. For example, the mobile device C 190 can receive one code from the mobile device A 110 and another code for the same offer from the mobile device B 170. When the mobile device C 190 applies the offer, the backend processing system 140 may be configured to credit the user who first passes the code to the mobile device C. For example, suppose the mobile device C 190 first receives the offer due to mobile device B's 170 promotion. The user device A 110 may not receive any proceeds even when the mobile device C 190 redeems the code. In other embodiments, both the user of the mobile device A 110 and the user of the mobile device B 170 may split (in accordance with a percentage) the proceeds from mobile device C's redemption of the offer.

In some embodiments, the various communications sent to and from individual mobile devices as discussed herein (such as indications that an offer was redeemed, indications that an offer has been shared, etc.) may be generated and delivered in real time or near-real time as the backend processing system 140 learns of the occurrence of the associated triggering action (e.g., an offer being scanned at a vendor, an offer sharing request being received at the system 140, etc.). In one embodiment, providing such real-time functionality may include employing WebSockets technology to establish a bi-directional real-time communication between the backend processing system 140 and an individual mobile device or vendor system. The communication channel employed in the WebSockets approach may include a Transmission Control Protocol (TCP) connection over the Internet, which a mobile device may communicate with via a front-end interface provided through either a browser or dedicated referral application operating on the mobile device. As will be appreciated by one or ordinary skill in the art, an application programming interface (API) may be employed that enables event-driven messages from the backend processing system 140 or other system or server to be delivered via an open, interactive WebSockets connection or similar open channel without the need for mobile push notifications to be sent to the mobile device or for use of a "pull" model in which the mobile device repeatedly checks with a server for new messages.

Example Processes of a Referral System

Figure 3:
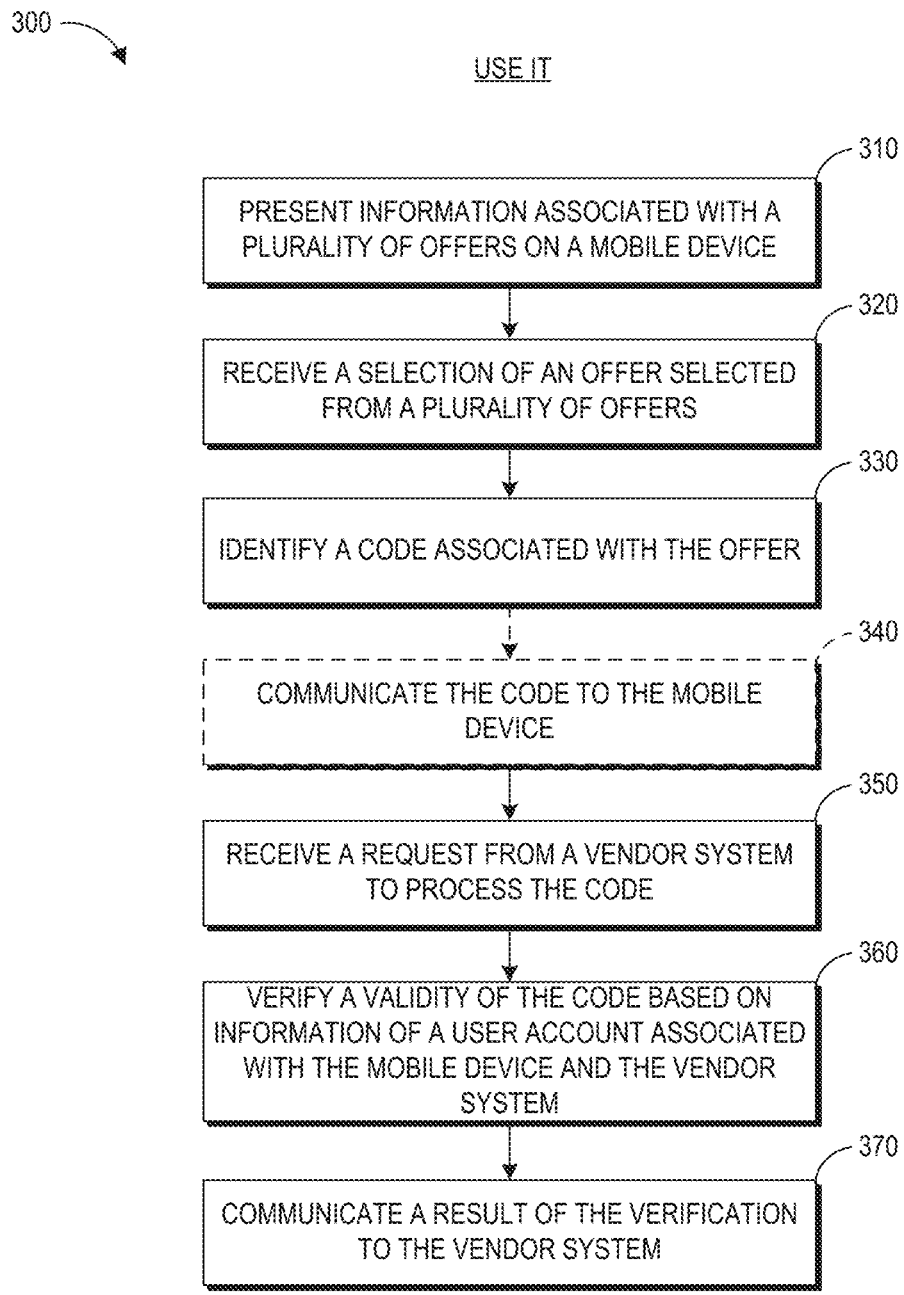
FIG. 3 illustrates an example process for using an offer referred by a promoter.

FIG. 3 illustrates an example process for processing an offer referred by a promoter. The example process 300 can be performed by the backend processing system 140.

At block 310, the backend processing system can present information associated with a plurality of offers on a mobile device. For example, the mobile device may have a mobile application (such as, e.g., a referral application) which manages the offers and referrals/earnings associated with the offers. The mobile application may be associated with a user account. Once the user logs into the mobile application, the mobile application can present the offers that the user is currently eligible to use. The offers may have been shared with the user by another user (e.g., a promoter, which may be a person that the user recently met or may be a social network connection of the user). One or more of the offers may alternatively be provided to the user by a vendor due to the user's visit at the vendor. For example, once a user visits a restaurant, the user may gain access to all coupons provided by that restaurant, in one embodiment (while in other embodiments, a user may be limited to using at most one offer from any given vendor). The backend processing system 140 can present the plurality of offers in a format shown in FIG. 7A. In some embodiments, when a user first signs up for the mobile application, the backend processing system can automatically provide a list of offers to the user to encourage the user to use the mobile application.

At block 320, the backend processing system can receive a selection of an offer from the plurality of offers. For example, a user can actuate the mobile device to select an offer. The mobile device (such as, e.g., the offer activation component 112) can communicate the selection to the backend processing system.

At block 330, the backend processing system can identify a code associated with the offer. The code may be previously communicated to the mobile device when a promoter shares the offer with the user of the mobile device. The code may alternatively be generated by the backend processing system when the user selects an offer. As an example of generating the code, the backend processing system can receive an offer identifier when the user selects an offer. The offer identifier may be specific to an offer but not specific to any users. Based on the offer identifier and the information of the user sharing the offer (e.g., a promoter's information), the backend processing system can generate a code associated with the offer. The code may include promoter specific information and the offer information (such as e.g., the offer identifier or the content of the offer). In certain embodiments, the data store 150 can create a new entry when a new code is generated. The entry may include the offer information, the promoter's information, the vendor information, the information of the users receiving the offer from the promoter, etc., alone or in combination. In other embodiments, the entries in the data store 150 may be based on the offer identifier. For example, one offer identifier may be associated with multiple codes (because multiple users may be promoters of the offer), together with other offer, vendor, or user information. As a result, when a new code is created, the data store 150 may update the entry of the offer identifier to include the new code (rather than to create a new entry).

As described with reference to FIG. 1, the code may be an alphanumeric string (such as, e.g., a random number, a universally unique identifier (UUID, also referred to as globally unique identifier), a string generated in accordance with an algorithm) or a graphical code (such as, e.g., a bar code or a QR code). In certain embodiments, the graphical code can represent the alphanumeric code. For example, an UUID may be provided as an input to a QR code generator to create a new QR code encoding the UUID. The backend processing system or a user's mobile device can generate the graphical code. For example, the backend processing system can generate the graphical code and communicate the graphical code to the mobile device. In other embodiments, the backend processing system can send the UUID (together with other information for generating the graphical code) to the mobile device. The mobile device can accordingly generate the graphical code.

Optionally, in some embodiments, the backend processing system can communicate the code to the mobile device at block 340. In other embodiments, where the backend processing system communicates the code to the mobile device when an offer is shared with the user, rather than when a user selects an offer, the backend processing system can access the code from the mobile device's local storage. The user who receives the promotion can present the code to a vendor system for applying the offer to a purchase.

In certain implementation, blocks 320, 330, and 340 may be performed on the mobile device. For example, the code associated with the offer may be stored on the mobile device. Once the user selects the offer, the mobile device can search for the code using the offer activation component 112 and present the code using the data presentation component 124.

At block 350, the backend processing system can receive a request from a vendor system to process the code. The vendor system can extract information (such as, e.g., the offer ID) from the code and pass the extracted information to the backend processing system for processing. For example, the vendor system can include a QR code extractor which can receive an image of a QR code and extract the offer ID and the promoter's user ID (or extract a UUID). The vendor system can then pass the offer ID and promoter's user ID (or the UUID) to the backend processing system for further analysis. In some embodiments, the backend processing system or the vendor system can retrieve the offer information based on the code. For example, where the graphical code encrypts an offer ID, the vendor system can extract the offer ID from the graphical code and communicate the offer ID to the backend processing system, The backend processing system can retrieve the offer information based on the offer ID.

At block 360, the backend processing system can verify a validity of the code based on information of a user account associated with the mobile device and the vendor system. The backend processing system can check whether the offer associated with the code has previously been used by the user. For example, the backend processing system can check whether the user ID has already been added to a list of user IDs associated with a vendor ID that is associated with the code.

At block 370, the backend processing system can communicate a result of the verification to the vendor system. For example, if the backend processing system determines that the user has previously used the offer, then the backend processing system can provide an indication to the vendor system such that the vendor system will not allow the user to apply the offer again for the current transaction. As another example, if the backend processing system determines that it is the first time that the user is using this offer (or any offer from the associated vendor, depending on the embodiment), the backend processing system may inform the vendor system to apply the offer for the currently transaction. As yet another example, if the backend processing system further determines that it is the user's first visit of the vendor, the backend processing system can associate the user ID with the vendor ID. The user can receive other offers from the vendor system and become a promoter for the vendor system such that the user can share other offers from the given vendor with another user.

In certain embodiments, one or more of the blocks 360, 370 can be performed by the vendor system. For example, the vendor system can identify the offer information based on the code and verify whether the user has previously activated the offer.

Figure 4A:
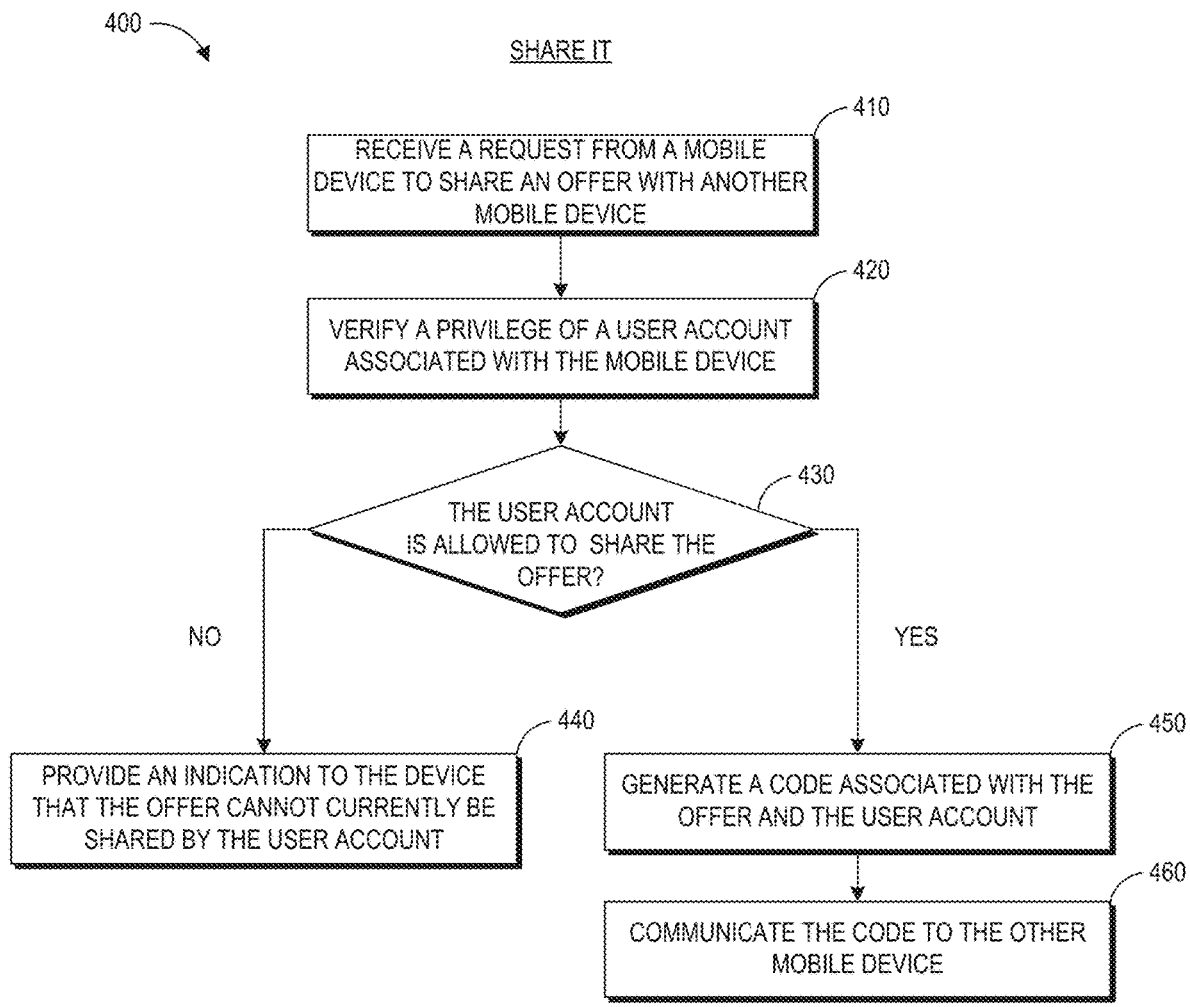
FIG. 4A illustrates an example process of sharing an offer with another user.

FIG. 4A illustrates an example process of sharing an offer with another user. FIG. 4A may be performed by the backend processing system 140. In some embodiments, the backend processing system can perform the example process 400 in combination with mobile devices (e.g., mobile device A 110 and mobile device B 170).

At block 410, the backend processing system can receive a request from mobile device to share an offer with another user having an account on another mobile device. For example, a user of the mobile device can view a list of offers that are available to him. The user can select an offer from the list and input another user's information (such as, e.g., email address, user name or ID, etc.) for sharing the offer with the other user's account. In other embodiments, the user may share an offer directly from the sharing user's mobile device to a recipient user's mobile device, such as via near-field communication (NFC) communication protocols (which may include sending information associated with the device-to-device NFC communication to the backend processing system for appropriate backend processing) or physical interaction. As an example of a physical interaction, according to one embodiment, two users may physically "bump" their phones or other mobile devices together after one of the users has selected a specific offer to share with the other user. Information associated with the bump interaction (such as a timestamp, accelerometer motion information, GPS or other location data, etc.) may be sent from each device to the backend processing system 140 or other remote system or server for analysis. The processing system 140 may then match the received bump information from each device to identify the device to receive the offer (e.g., the sharing user's mobile device may have sent a sharing request to the referral system, and the intended recipient device may be identified by the referral system by identifying that bump information received from a specific device matches a timestamp and motion data received from the sharing user's device at or near the time of the sharing request).

At block 420, the backend processing system can verify a privilege of a user account associated with the mobile device. For example, the backend processing system 140 can verify whether the user associated with the user account has visited the vendor associated with the selected offer.

At block 430, the backend processing system can determine whether the user account is allowed to share the offer. For example, the backend processing system can determine whether the user account has previously used the offer or whether the user has been to the vendor. The backend processing system can make such determination by identifying whether the user ID has previously been linked to the offer ID or the vendor ID.

In response to a determination that the user account can't share the offer, at block 440, the backend processing system can provide an indication to the mobile device indicating that the offer cannot currently be shared by the user account. As an example, the backend processing system can provide a suggestion for the user to try the offer or the vendor before sharing. The backend processing system can also suggest another offer of the vendor for the user to try.

In response to a determination that the user account can share the offer, at block 450, the backend processing system can generate a code associated with the offer and the user account. For example, the code may be 2D bar code or QR code. The code may encrypt the user's ID and the offer ID. The code may alternatively be an alphanumeric string generated randomly or in accordance with a set of rules. The alphanumeric string may be associated with the user ID and the offer ID. When the vendor receives the code, the vendor can extract the alphanumeric string and communicate the alphanumeric string to the backend processing system. The backend processing system can therefore identify the user ID and the offer ID based on the alphanumeric string, such as by utilizing a lookup table that associates the user ID and offer ID with the string or by extracting the user ID and offer ID directly from the string.

At block 460, the backend processing system can communicate the code to the other mobile device. When the other user logs into the referral application on the other mobile device, the other mobile device can present the offer associated with the code among a list of available offers. In other embodiments, the other user may receive a text message or email that enables that user to redeem the offer without creating an account with the referral service and without being required to have the referral application installed on the user's mobile device or other computing device (as will be discussed further below). The code can encrypt the information of the user sharing the offer alone or in combination with the information of the offer. As an example, the code may encrypt an offer ID. The other mobile device can extract the offer ID from the code and use the offer ID to retrieve offer information (such as image of the restaurant, offer content, etc.) from the backend processing system for presentation on its user interface (either in a user interface generated by the referral application or generated within a browser interface loaded on the user's device as the result of the user selecting a URL in a text message, scanning a graphical code, or other sharing mechanism described herein).

Figure 4B:
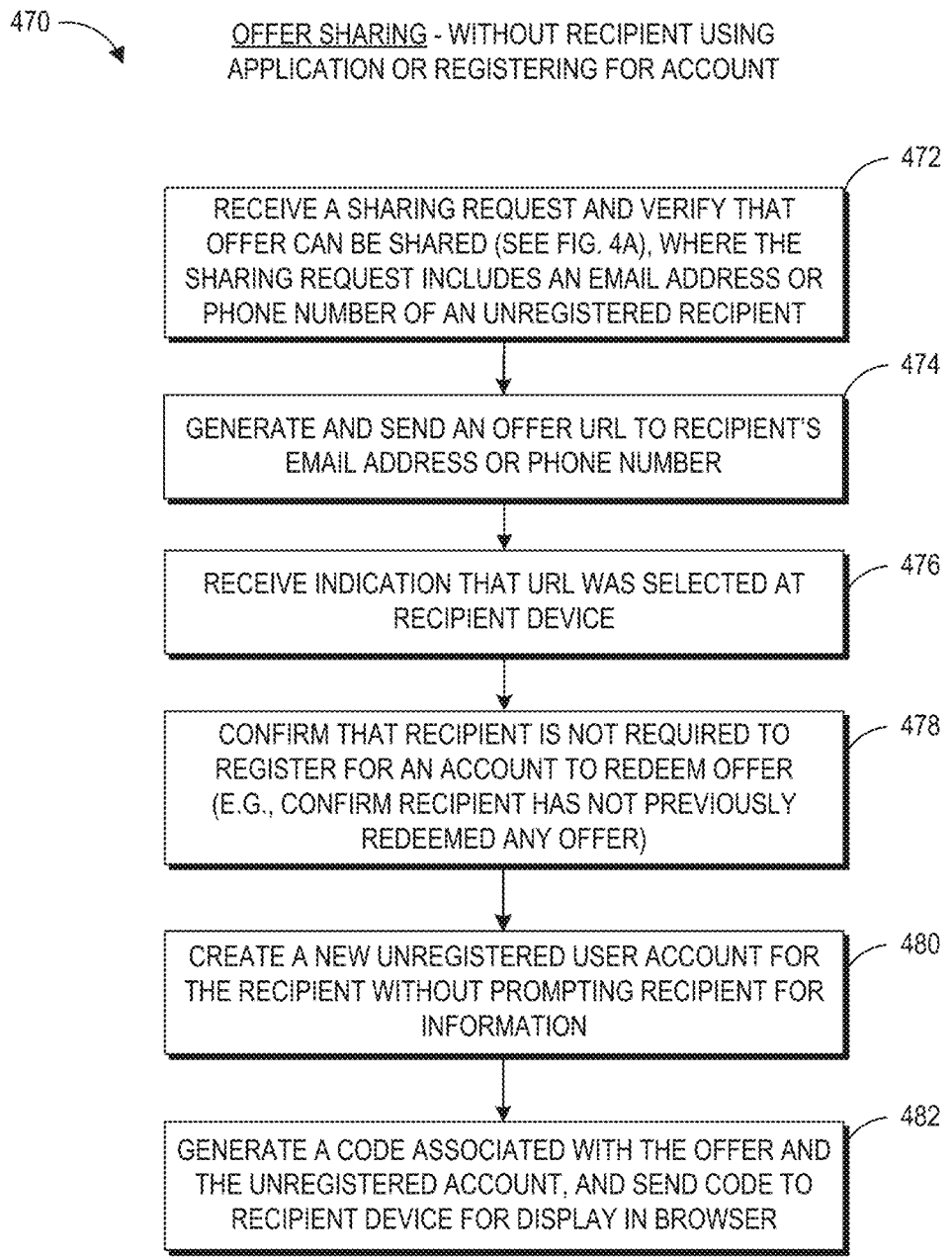
FIG. 4B illustrates an example process of sharing an offer with a recipient in a manner that doesn't require the recipient to create an account or install any application on his computing device in order to redeem the offer.

FIG. 4B illustrates an example method 470 of sharing an offer with a recipient in a manner that doesn't require the recipient to create an account or install an application related to the offer service on his computing device in order to redeem the offer. The illustrative method may be performed by the backend processing system 140. The method begins at block 472, where the backend processing system receives a sharing request from a user (e.g., a request for a sharing user to share an offer with an identified recipient) and verifies that the offer can be shared, which may be performed in a manner similar to that discussed above with respect to FIG. 4A. The sharing request may include an email address or phone number of the recipient, as entered by the sharing user via a user interface.

At block 474, the backend processing system may generate a uniform resource identifier ("URI," such as a uniform resource locator, URL) associated with the offer and send this to the recipient using the recipient's email address or phone number received above. In other embodiments, the backend processing system may instead send the generated URL to the sharing user so that the sharing user may then send the URL himself to an offer recipient via a text message, email or other communication method. The URL generated at block 474, in some embodiments, may include an identifier that references a database record that the backend processing system creates in response to the sharing request, where the database record may include information such as an identifier of the sharing user, an identifier of the offer, and optionally an identifier of the recipient user (though in other embodiments, information regarding the recipient user may not be included in the database until a recipient actually selects the URL to generate a corresponding graphical code). In some embodiments, the URL may be a one-time use URL in the sense that once the URL is selected from a device (e.g., someone "clicks" or otherwise selects a link associated with the URL), the backend processing system may modify the associated database record to indicate that the URL has been selected and is thus no longer active for subsequent uses. The URL may additionally include token information, authentication information, or other security features that associate the URL with only one specific intended recipient or user.

At block 476, the backend processing system receives an indication that the URL was selected at a recipient device (e.g., the recipient of the offer received an link by text message or email, and subsequently clicked, tapped or otherwise selected the link to request a webpage or other data associated with the underlying URL). The backend processing system may then determine at block 478 that the recipient does not have an account with the offer service based on the recipient's email address, phone number, and/or information entered by the user. If instead the recipient does have an account or selects to create an account (not illustrated), use of the offer may proceed as previously discussed above. At block 478, the backend processing system may further confirm that the recipient is not required to create an account with the offer service in order to redeem the given offer. For example, the offer service may only allow a threshold number of offer redemptions (such as one) by an unregistered individual before requiring that the individual create an account and/or install an offer application on his mobile device.

At block 480, the backend processing system then creates a new unregistered user account for the recipient. In some embodiments, an unregistered user account may be a special account type designated in a different manner in a database than a standard user account (such as by having a certain flag or value associated with an account type field), where creating the unregistered user account does not require a user to enter personal information or other information that may be required of a standard account with the offer service. In some embodiments, the user may not be aware that any account is being created (e.g., he may not be prompted to enter any information or request that an account be created).

The unregistered user account information stored at block 480 may, for example, include the individual's name and the contact phone number that were supplied by the sharing user who sent the new user an offer, without asking that the new user enter additional information. The backend processing system may confirm beforehand that the phone number and/or email address of the user have not been previously associated with another unregistered account (in which case the user may be required to register for a full account, in some embodiments, as a repeat user of the offer service). In some embodiments, a new user given an unregistered account may later choose to convert to a standard account (e.g., may choose to actually register for an account with the offer service), at which point the backend processing system may add additional data fields to the account information and change the appropriate account type tag or field. In embodiments other than that illustrated in FIG. 4B, the unregistered user account creation at blocks 478 and 480 may instead occur prior to generated the offer URL at block 474, and the offer URL may be associated with the newly created unregistered user account.

At block 482, in order to respond to the URL selection, the backend processing system may generate a code associated with the offer and the unregistered account, and then send the code to the recipient device for display in a browser (such as within a webpage generated by the backend processing system and sent to the recipient device for display). The code generation may be similar to that described above with respect to FIG. 4A, but may be delivered for display via a browser or other third-party application rather than via an application specifically associated with the offer service.

Figure 5:
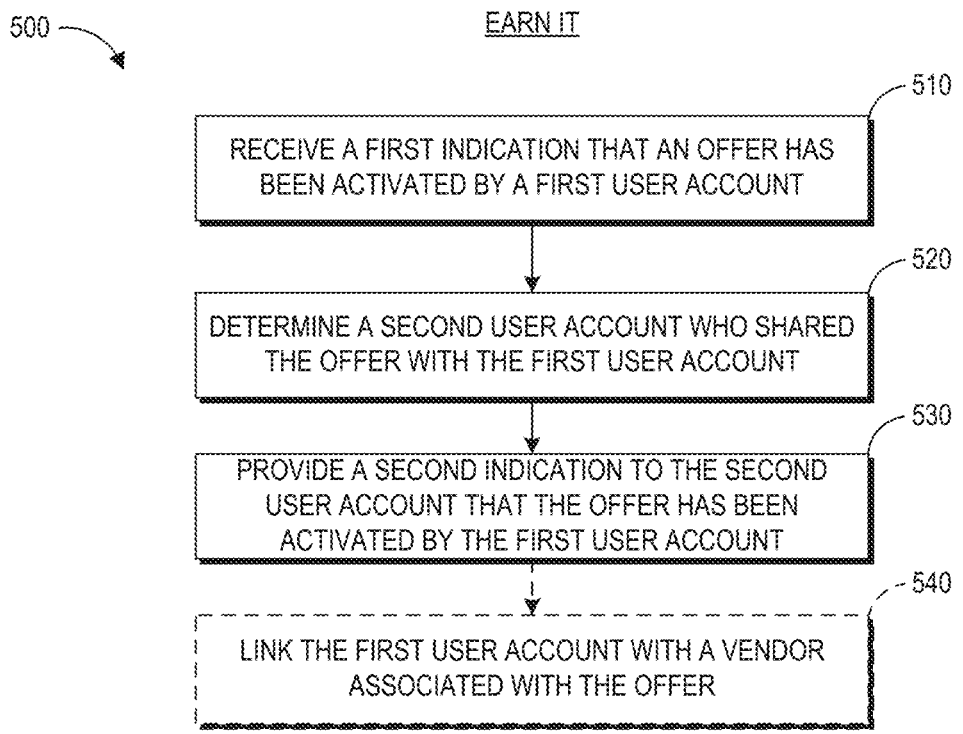
FIG. 5 illustrates an example process of redeeming a reward from a shared offer.

FIG. 5 illustrates an example process of redeeming a reward from sharing an offer. The example process 500 may be performed by the backend processing system 140 alone or in combination with the vendor system 160.

At block 510, the backend processing system can receive a first indication that an offer has been activated by a first user account. For example, the backend processing system can receive, from the vendor system, an indication that the user has redeemed the offer.

At block 520, the backend processing system can determine a second user account which previously shared the offer with the first user account. For example, the backend processing system can receive a code of the offer. The code may encrypt the second user's information (such as, e.g., the user ID of the second user). The backend processing system can accordingly identify the second user based on information encrypted in the code. As another example, although the code itself may not include promoter's information, the code may be linked to the second user in the data store. For example, the code may be translated to an alphanumeric string that's linked to the second user's ID. Accordingly, the backend processing system can look up the second user's information based on the code. Either the backend processing system or the vendor system can extract the information from the code.

At block 530, the backend processing system can provide a second indication to the second user account indicating that the offer has been activated by the first user account. For example, the backend processing system can transfer to the second user's account a portion of the proceeds due to the vendor's transaction with the first user. Additionally or alternatively, the backend processing system can send a message to the second user indicating that the first user has applied the offer. The message can include an increase in the account balance due to the portion of the proceeds awarded to the second user.

Optionally at block 540, the backend processing system can link the first user account with the vendor which provides the offer. Accordingly, the first user may not be able to re-apply the same offer although the first user can later become a promoter of the same offer. Additionally or alternatively, the first user account may have access to other offers provided by the vendor after it has applied the offer during a transaction with the vendor.

Vouchers or offers of types other than those discussed above that are shared from one individual to another individual (which may be considered a consumer-to-consumer shared voucher) may be implemented and shared in accordance with aspects of the present disclosure. For example, features and systems described herein may be used for distributing and redeeming business-to-consumer vouchers or other offers that a manufacturer, vendor, distributor or other business associated with products or services provides in the form of discounts, free items/services, and/or other offers to a business or individual consumer.

As one example of an alternative offer type, one type of voucher available via certain embodiments of the present disclosure can be redeemed for a given product or service at any of multiple merchants, stores, retailers, resellers, service providers, and/or other businesses. In such embodiments, a network of different independent retail stores may be registered as vendors in the referral system, and may be willing to fulfill or redeem offers distributed to consumers by other parties. As an example, a given beverage brand may share an offer with users (or enable consumers to share the offer with each other) via the referral system that allows a recipient of the offer to receive a free bottle of a specific beverage made by that brand at any of a number of independently owned grocery stores, liquor stores, and/or other stores in the referral system's network. When such an offer is redeemed at one of those store locations, the store may be reimbursed by the beverage brand for the store's cost of the bottle (plus some profit, depending on the embodiment).

Another example of an alternative offer type available via certain embodiments of the present disclosure is a user-to-user (or consumer-to-consumer, or individual-to-individual) offer whereby a sharing user selects to send an offer to another individual that the sharing user pays for in some manner to enable the receiving user to receive a discount or free products or services from one or more third-party businesses. For example, a user of the system may select to send a voucher for a free bottle of wine to a friend, where at least some of the cost of the wine once redeemed is paid for by the sharing user, a seller (e.g., a liquor store or other retailer), a manufacturer (e.g., the winery), or a distributor. In other embodiments, the item or service may not be free to the receiving user, but the receiving user may only pay a portion of the cost, where the portion may be significantly less than the typical price of the item or service even when offered during a sale or discount period (e.g., the receiving user paying $5 for a $40 item). The company sharing such an offer with a consumer may be able to indicate to the referral system whether the recipient user can subsequently share the offer with other users (e.g., become a promoter user with respect to that company or that specific offer) or if the offer is instead a one-time or user-specific offer without sharing privileges.

Example User Interfaces of a Referral System

FIGS. 6A, 6B, 7A, 7B, 7C, 7D, 7E, 8A, 8B, 8C, 9A, 9B, 9C, 9D, 10A, 10B, and 10C illustrate example user interfaces of a referral system. The example user interfaces in these figures can be user interfaces presented for display on a mobile device. The referral system can be implemented by the backend processing system 140 alone or in combination with mobile devices (such as, e.g., mobile devices of users or vendors). For example, in some embodiments, entire user interfaces or pages may be generated by the backend processing system 140 and sent to a mobile device for display via a browser or specialized application operating on the mobile device. In other embodiments, the one or more user interfaces may be generated entirely by a mobile device without receiving any communication from a backend processing system. In still other embodiments, portions of a user interface may be generated by the mobile device based on data received from the backend processing system.

Figure 6A:
FIGS. 6A, 6B, 7A, 7B, 7C, 7D, 7E, 8A, 8B, 8C, 9A, 9B, 9C, 9D, 10A, 10B, 10C illustrate example user interfaces of the referral system.
Figure 6B:
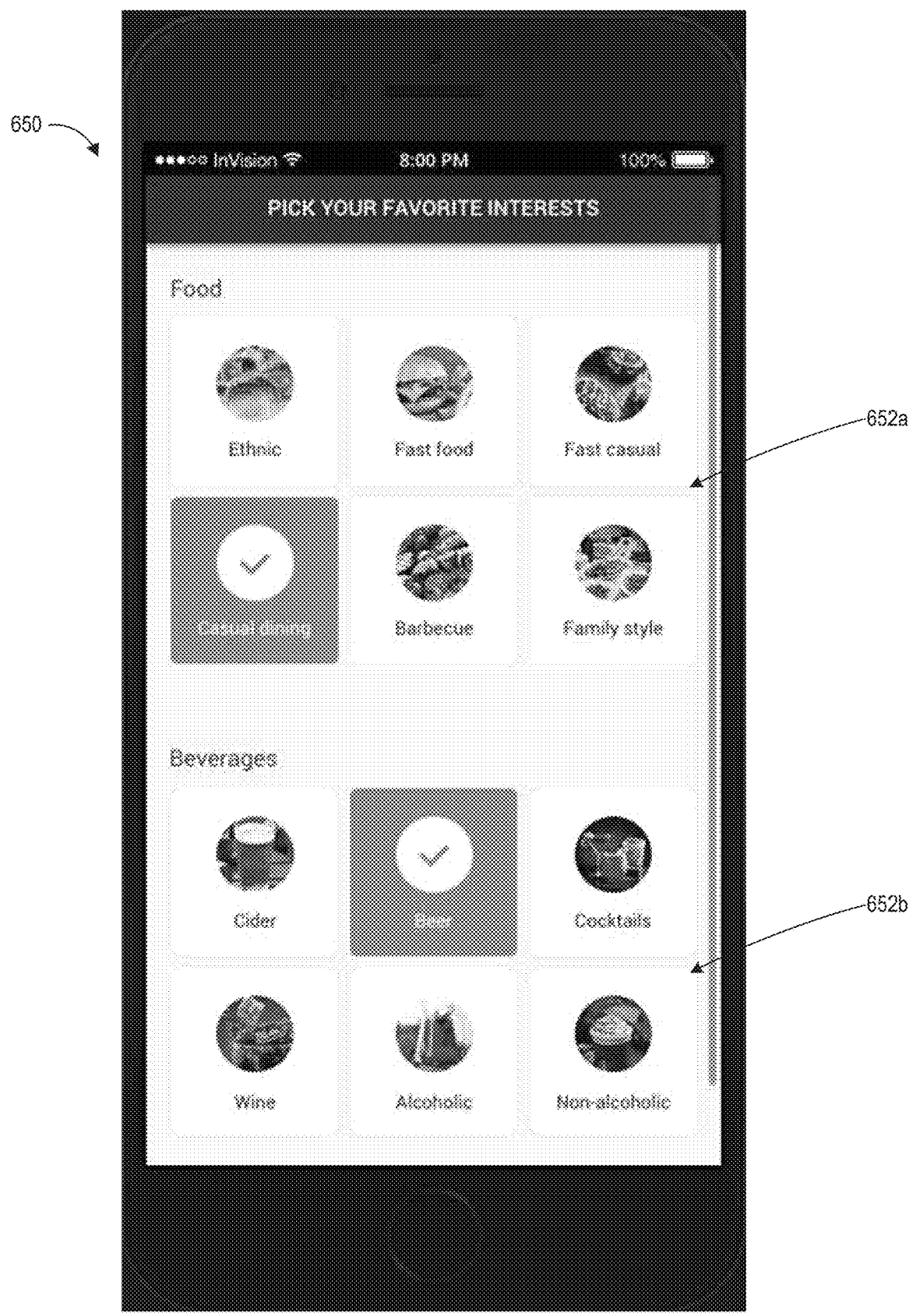

FIGS. 6A and 6B illustrate example user interfaces 610 and 650 when a user signs up for the referral system. The user interface 610 presents a login window where the user can input his login credentials. For example, if the user has previously registered an account with the referral system, the user can input his email address at the block 612 and the password at the block 614. Once the user inputs his login credentials, the user can select the log in box 616a to log into his account. The user can also input his email address and password associated with his social media account (such as, e.g., an existing social media account maintained by a third party social media service provider) and can select the log in box 616b to log into the referral system with his social medial account.

If the user does not have an account set up with the referral system, the user can choose the sign up option to establish an account. Once the user's account is established, the backend processing system 140 can create a user account ID for the newly established account. The user can also set his preferences. The user can pick his interests at the user interface 650. For example, the user can select the food that he is interested in using the user interface element 652a and select the beverages that he is interested in using the user interface element 652b. In the example user interface 650 shown in FIG. 6B, the user has picked casual dining and beer. In certain implementations, the user can pick more than one type of food or beverages. For example, the user can pick both casual dining and fast food on the user interface 650.

FIGS. 7A-7D illustrate example user interfaces for using an offer on a referral system. The user interface 710 shows the offer 712 and a portion of the offer 718. The offer 712, as shown, can include information associated with the offer, such as the discount 716, the vendor 714a providing the offer, an image of the offer 714b, the deadline 714c for redeeming the offer, and a message 714d sent by the promoter of the offer.

Figure 7A:
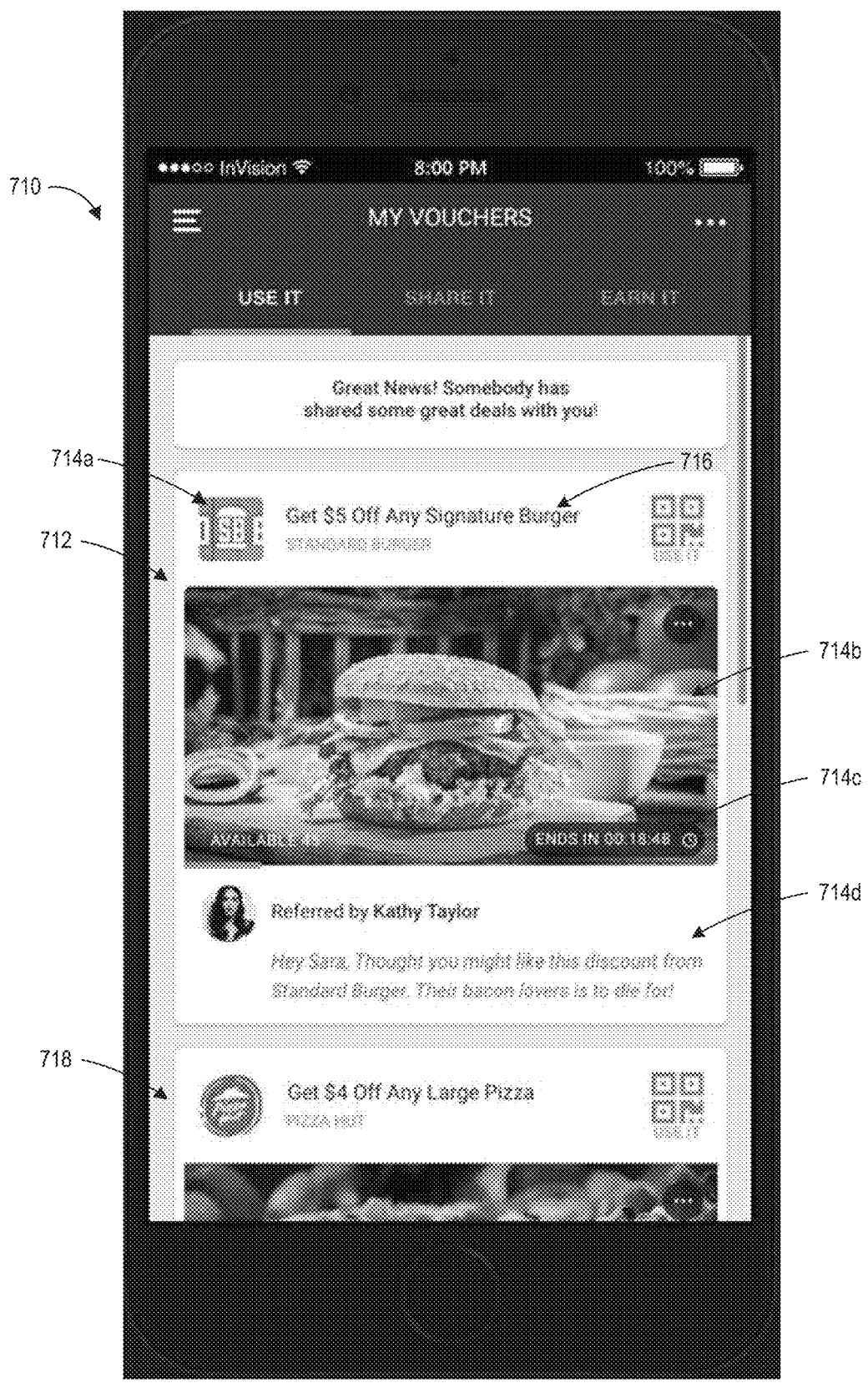
Figure 7B:
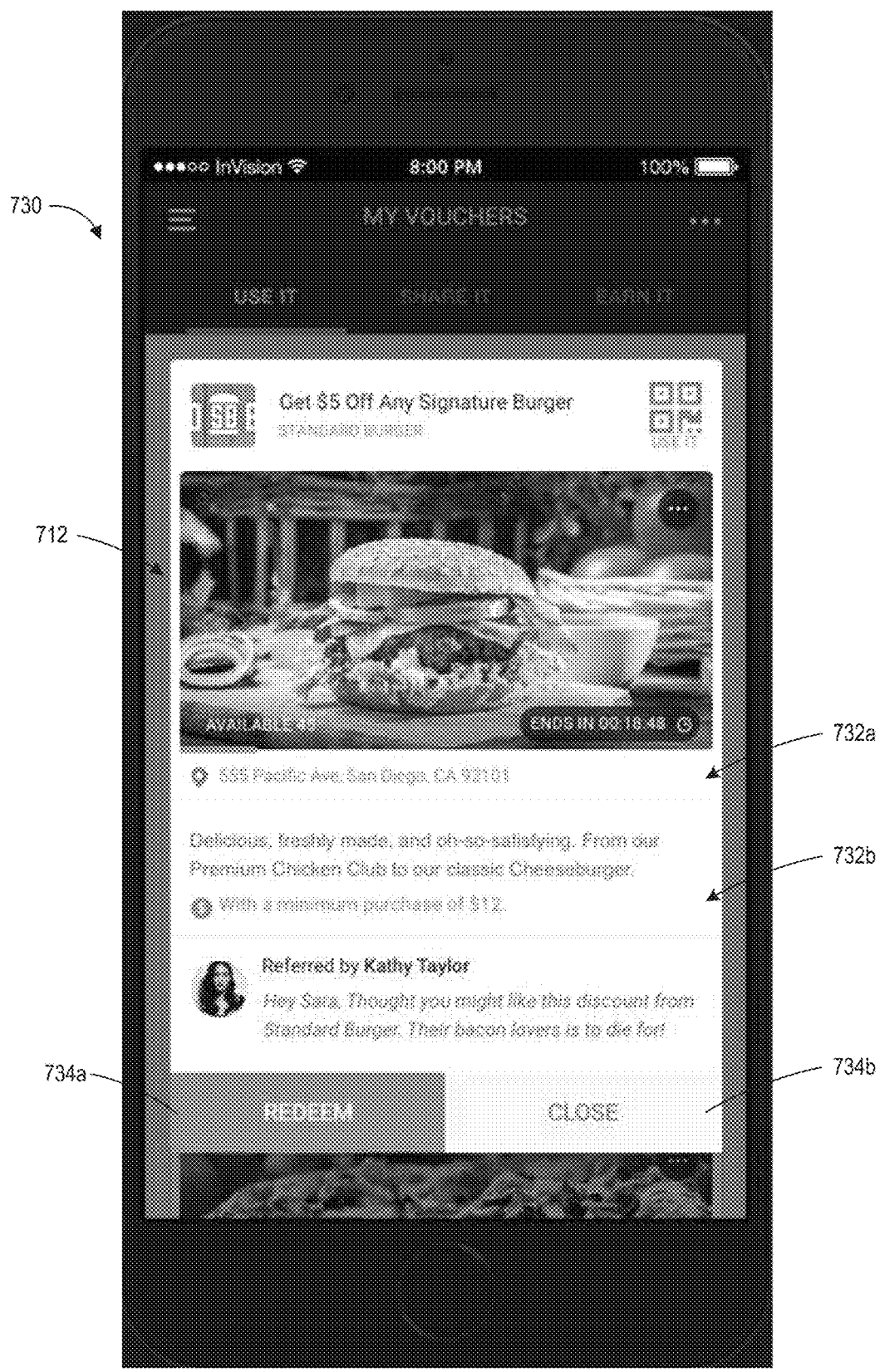

The user can select the offer 712, for example, by touching the image of the offer 714b. FIG. 7B illustrates an example user interface 730 after the user selects the offer 712. The user interface 730 can include more detailed information of the offer 712. For example, the user interface 730 can include the location of the vendor 732a as well as conditions 732b for redeeming the offer. For example, the conditions 732b as shown in FIG. 7B include "a minimum purchase of $12". The user can redeem the offer by actuating the user interface button 734a. On the other hand, the user may choose to not redeem the offer or close the user interface 730 by actuating the user interface button 734b.

Figure 7C:
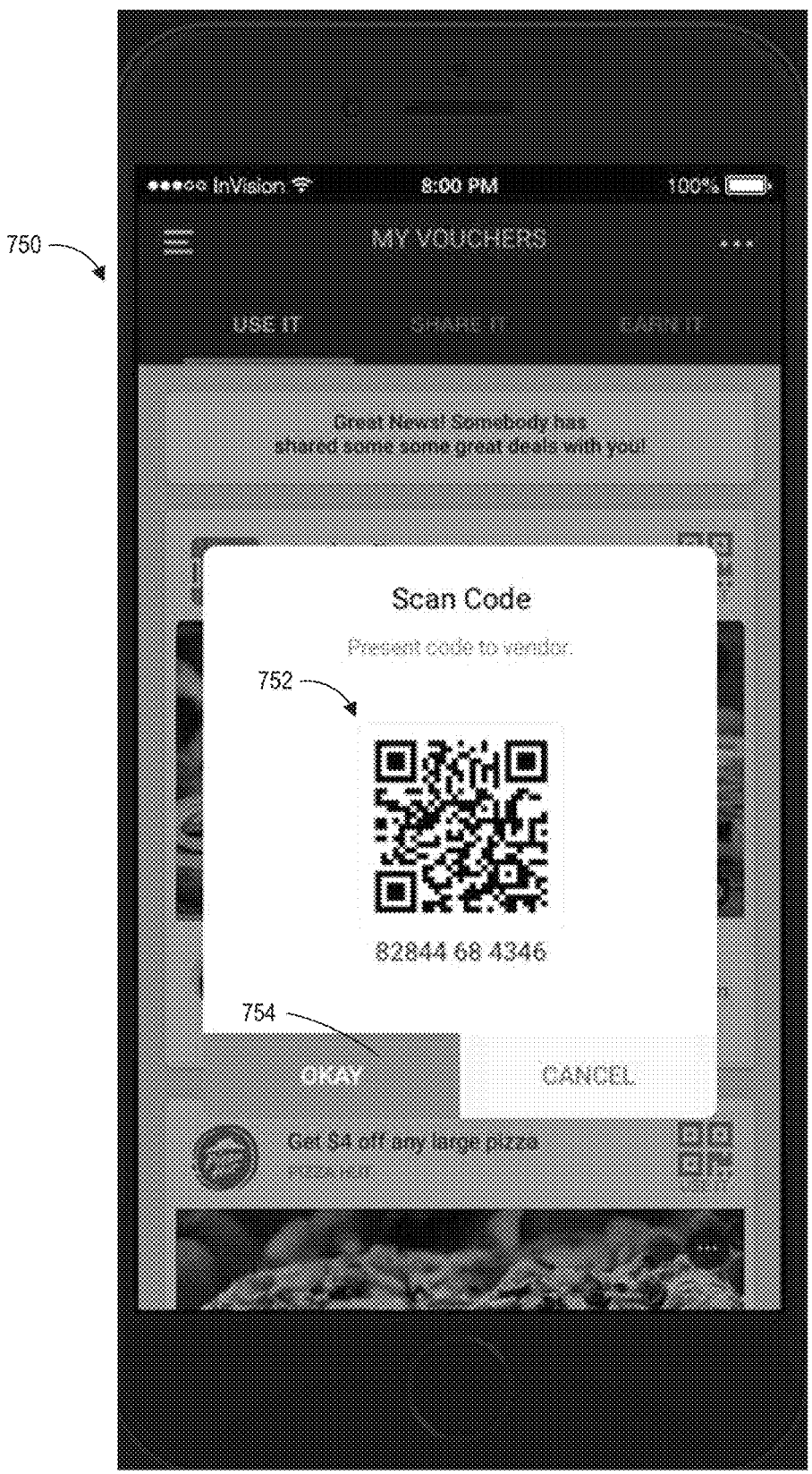
Figure 7D:
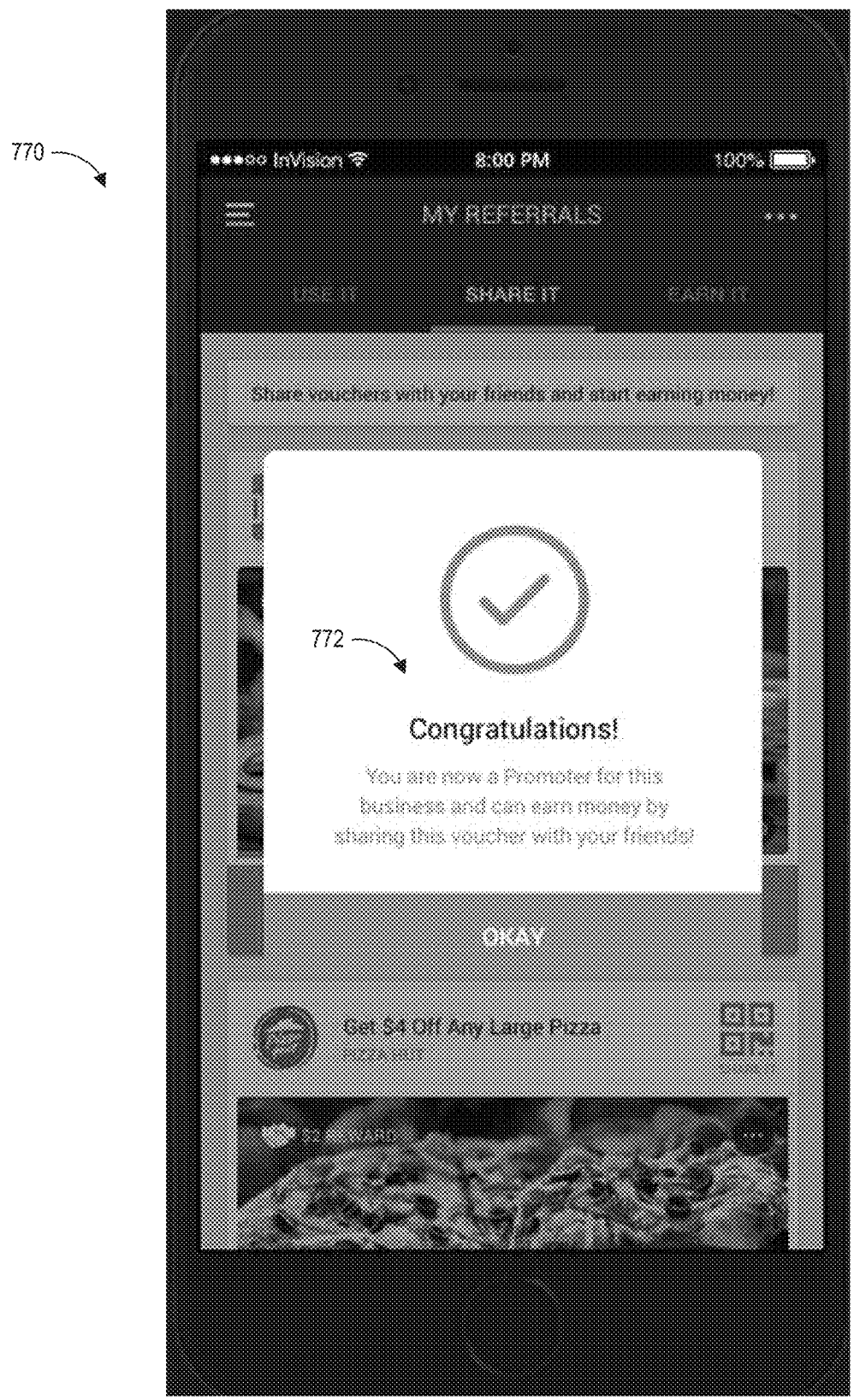

When the user actuates the user interface button 734a to redeem the offer, the user interface 750 in FIG. 7C may be presented. The user interface 750 can include a code 752 associated with the offer 712. The code can include a QR code and an alphamerical string. In certain embodiments, the QR code can encrypt the alphanumeric string. As further described with reference to FIGS. 8A-8C, the vendor system 160 can scan the code to apply the offer to the user's purchase. Once the vendor system 160 has scanned the code, the user can actuate the user interface button 754 to close the code and return to the user interface 710.

As described with reference to FIGS. 1 and 2, once the user has redeemed the offer, the user can become a promoter of the vendor and can share the offers associated with the vendor with other users. The backend processing system 140 can provide an indication to the user informing the user that he has become a promoter. The indication may be the user interface 770 in FIG. 7D. The user interface 770 may include the message 772 showing that the user is now a promoter of the vendor and can earn money by sharing the voucher (which he just redeemed) with other people.

Figure 7E:
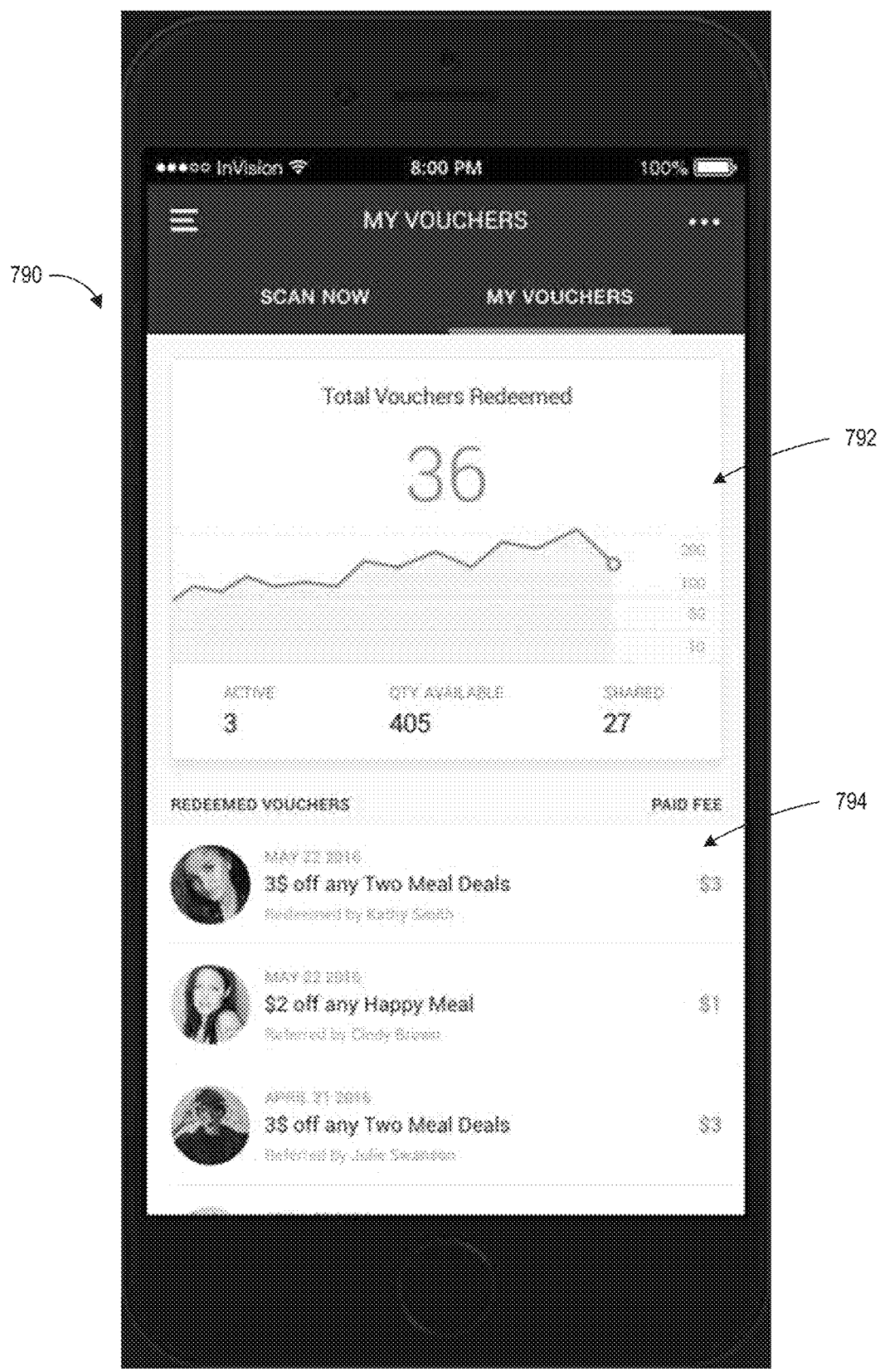

The user can view the offers that he has redeemed as well as statistics related to redeeming the offers at the user interface 790 in FIG. 7E. For example, the user interface element 792 shows the total number of offers that the user has redeemed, the number of current active offers, the total number of offers available to the user, as well as the number of offers shared by the user. The user can also review information associated with the redeemed offers at the user interface element 794. For example, the user interface element 794 can show the date of redemption, the amount of payment, and the description of the offer. In certain embodiments, once the user has redeemed an offer, the offer will no longer be presented at the user interface 710 (shown in FIG. 7A), rather the offer will be shown on the user interface 790.

Figure 8A:
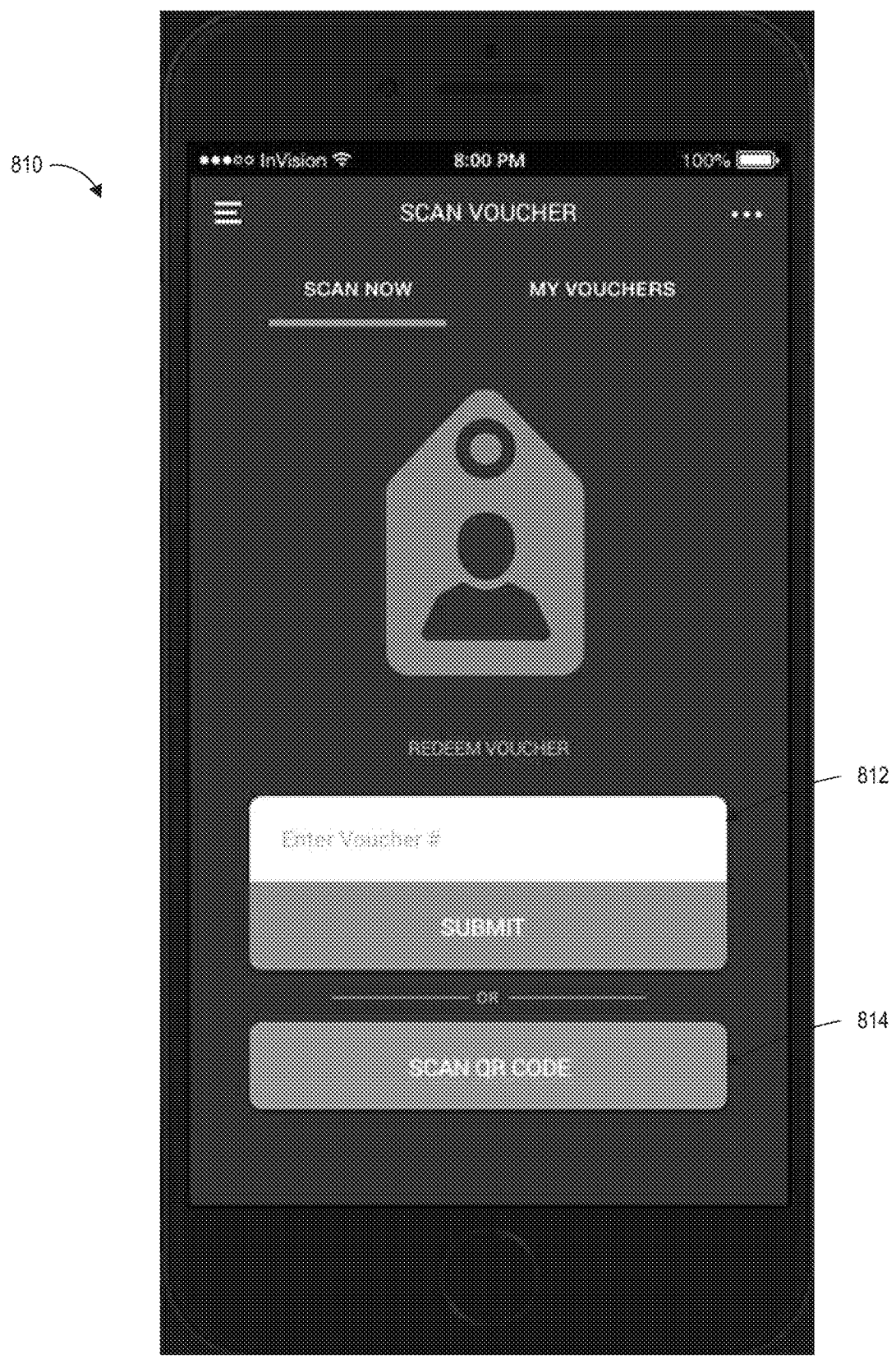
Figure 8B:
Figure 8C:
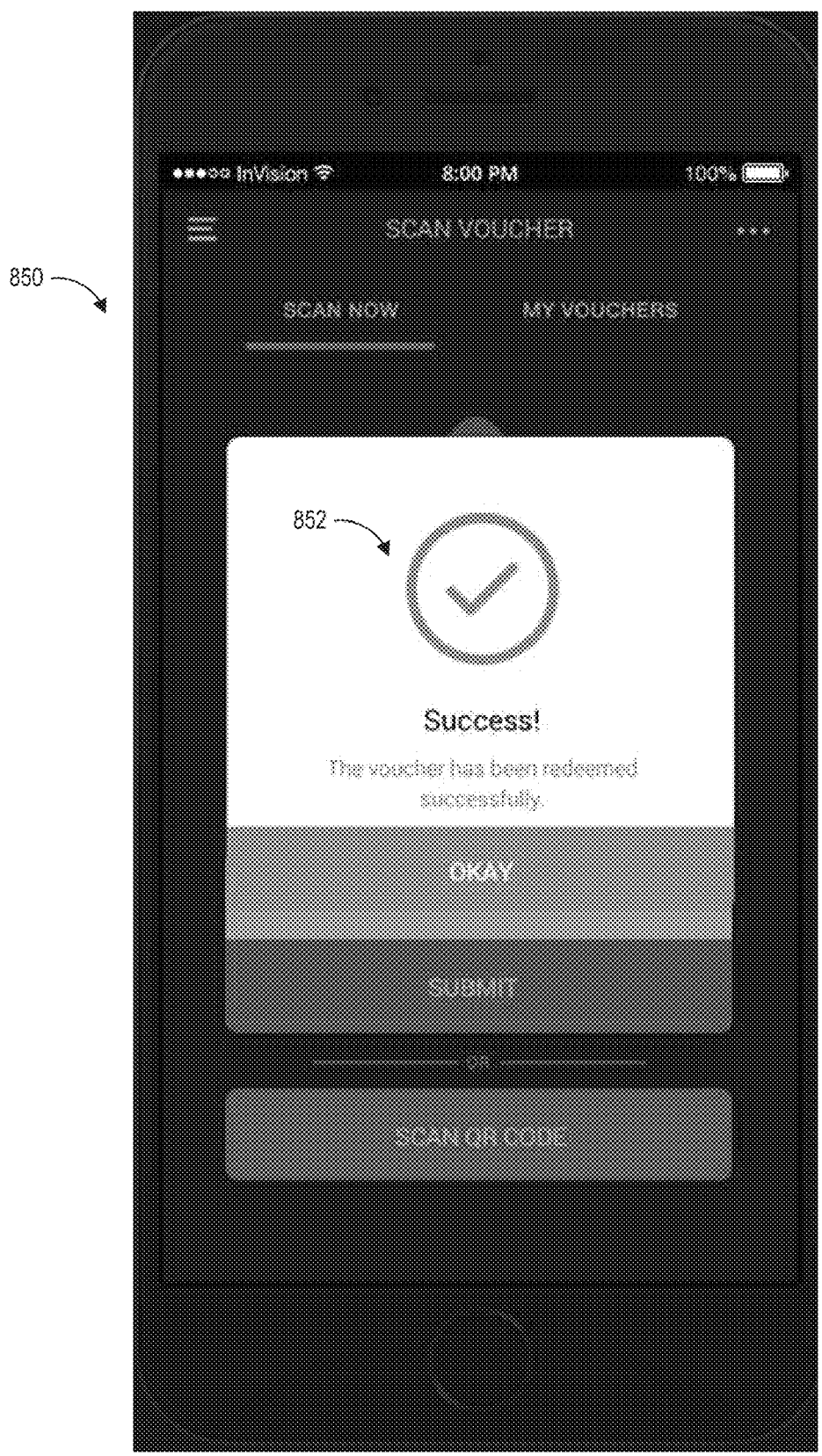

FIGS. 8A-8C illustrate example user interfaces of the vendor system 160. At the user interface 810 in FIG. 8A, the vendor system 160 can acquire an offer presented by the user by inputting a voucher number (such as, e.g., the alphanumeric string shown in the code 752) at the user interface element 812 or by scanning the code (such as, e.g., the QR code in the code 752). If the vendor chooses the scan the QR code (for example, by actuating the user interface button 814), the referral system can present the user interface 830. The user interface 830 in FIG. 8B shows the current position of the optical sensor (such as, e.g., a camera of a vendor's mobile device) by presenting a frame 832. The optical sensor can scan the code 752. The user interface 830 can show the code 752 as scanned by the optical sensor.

Once the vendor system 160 acquires the code, the vendor system 160 can communicate with the backend processing system 140 to verify the validity of the code and the offer. If the code and the offer are valid, the backend processing system 140 can communicate an instruction to the vendor system 160 to present the user interface 850 shown in FIG. 8C. The user interface 850 can include a message 852 indicating that the voucher has been redeemed successfully. In some embodiments, the backend processing system 140 can also instruct the user's mobile device (e.g., the mobile device A 110) to present the user interface 770 indicating that the user has become a promoter (because the user has transacted at the vendor).

Figure 9A:
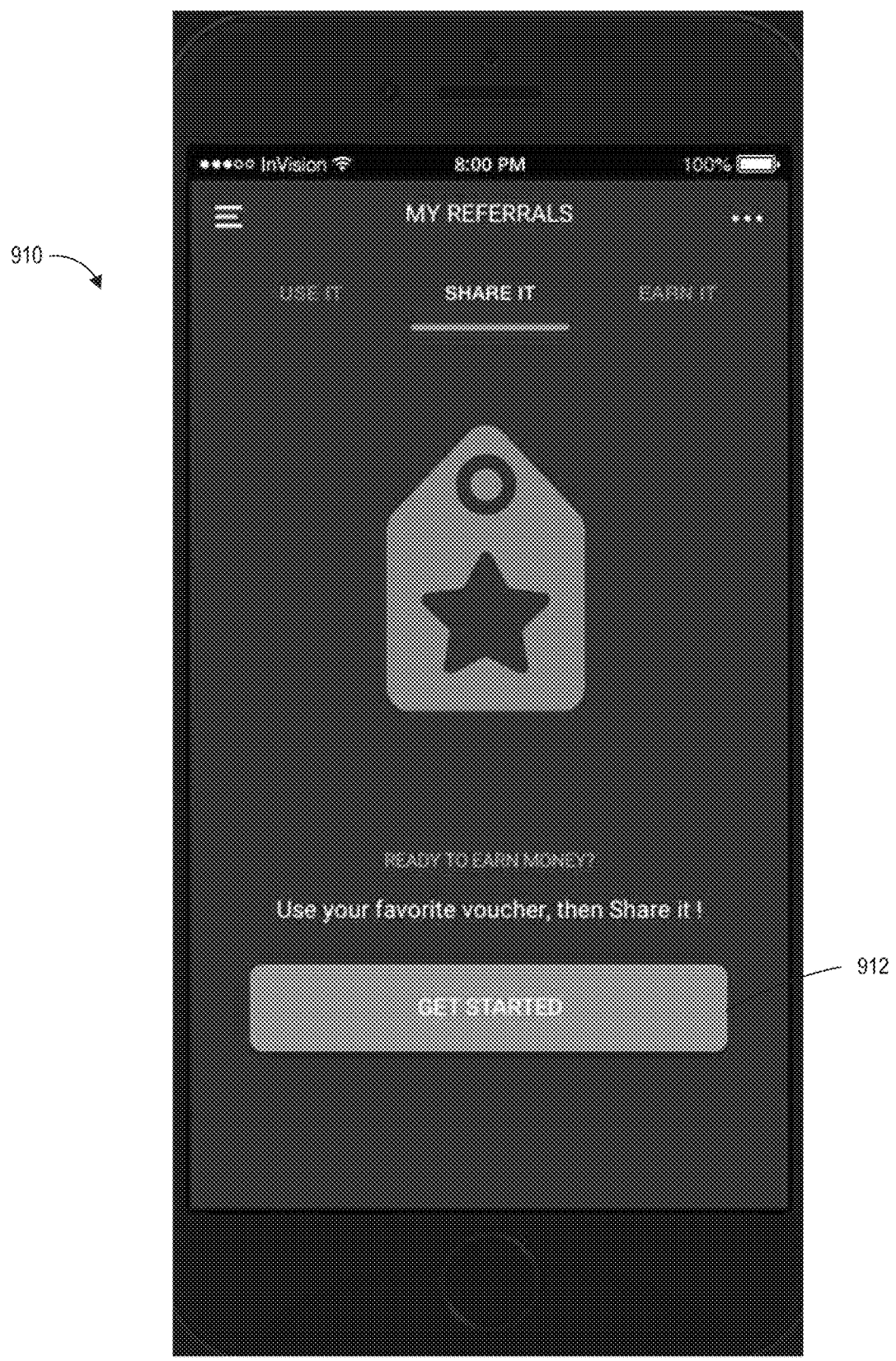
Figure 9B:
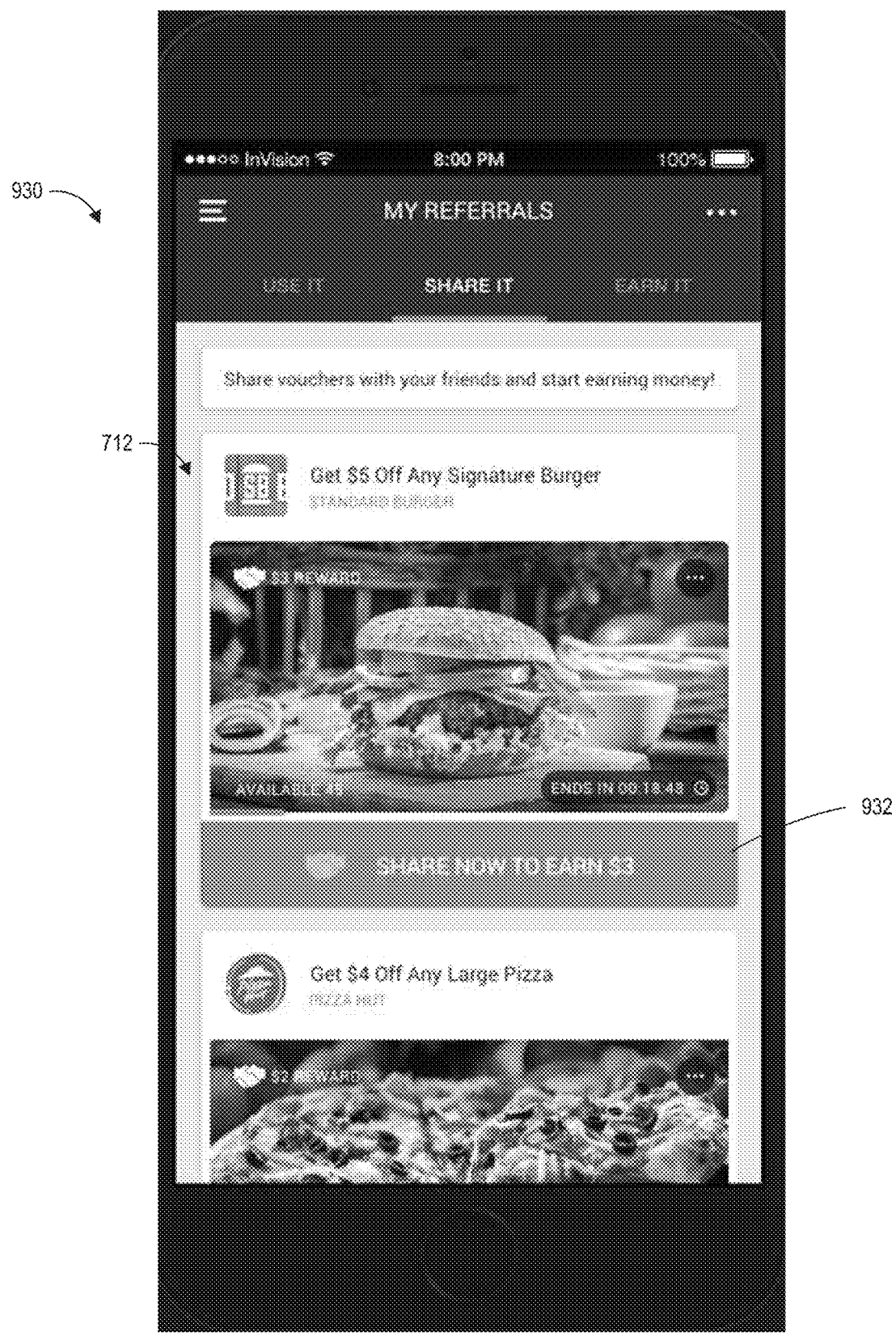

FIGS. 9A-9D illustrate example user interfaces for sharing an offer. On the user interface 910 in FIG. 9A, a user can actuate the user interface button 912 to start sharing offers with other users. Once the user actuates the user interface button 912, the referral system can present the user interface 930 in FIG. 9B which shows a list of offers that the user can share. In some embodiments, different options may be presented in a sharing user interface presented to an employee of a vendor (who may be able to share offers of that specific vendor in a manner that does not provide the employee user with individual referral compensation) (not illustrated), then the illustrated interface in FIG. 9B presented to a typical consumer user. The user interface 930 can also show the amount of monetary compensation that the user will earn by sharing the offer with another user or when the other user redeems the offer. Offers may become shareable if the user has previously visited the vendors providing the offers or when the user has redeemed the offers themselves. For example, assuming that the user has redeemed the offer 712, the user can actuate the user interface element 932 to share the offer with another user.

Figure 9C:
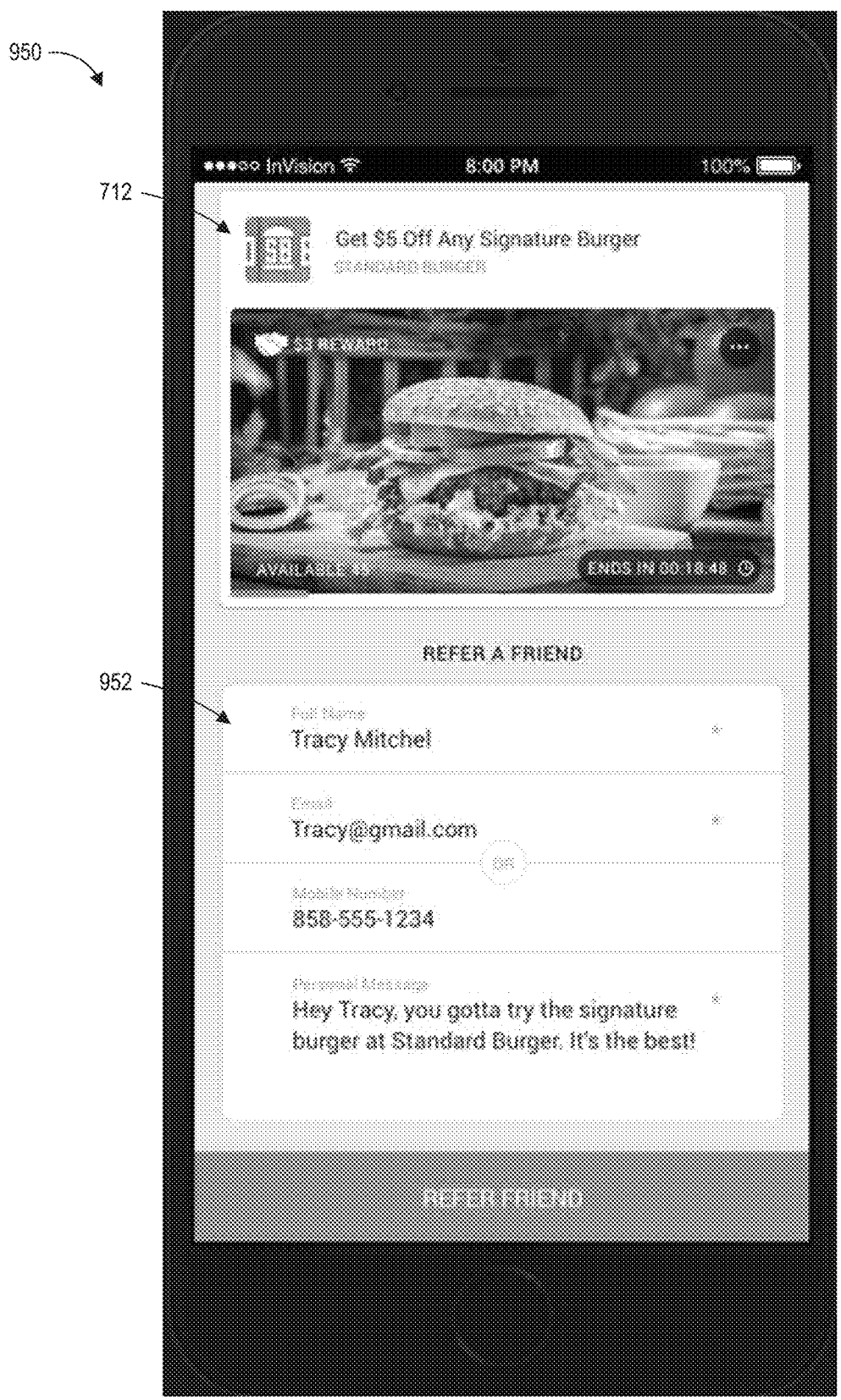
Figure 9D:
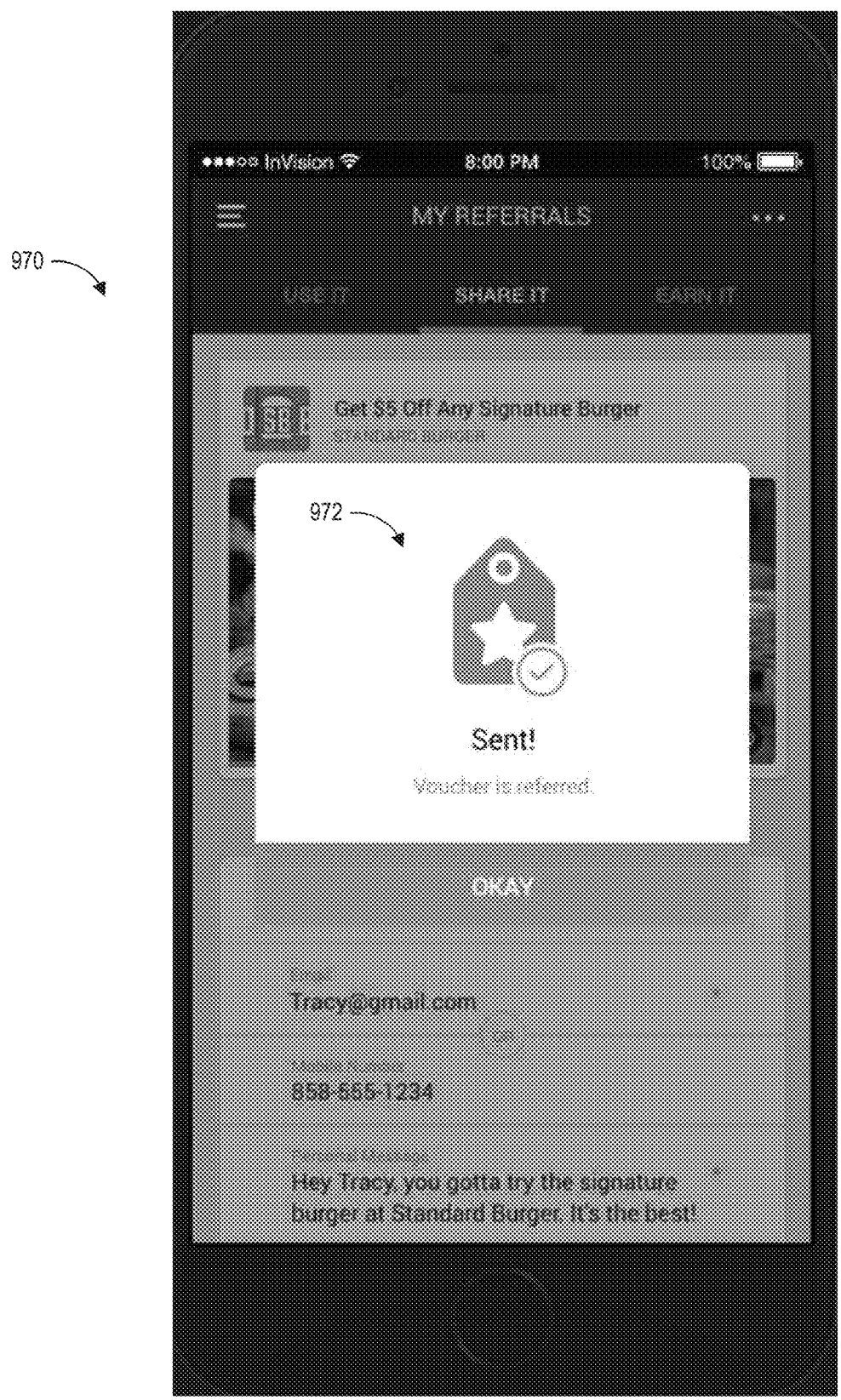

When the user actuates the user interface element 932, the referral system can present the user interface 950 in FIG. 9C. The user interface 950 can include information of the offer 712 as well as various input fields 952 where the user can input the other user's contact information and a personal message. In other embodiments, the application presenting the user interface 950 on a user's mobile device may prompt the user to select the desired recipient from a contact list in the mobile device (such as a contact list built into a mobile phone's operating system that includes phone numbers, email addresses and other contact information), rather than type the desired recipient's name, email address or other information into separate fields. Once the user chooses to send the referral, the user interface 970 in FIG. 9D may be presented. The user interface 970 can include a message 972 indicating that the offer has been referred. In some embodiments, once the user selects to share the offer with the other user, the backend processing system can automatically communicate a code associated with the user and the offer to the other user's mobile device.

Figure 10A:
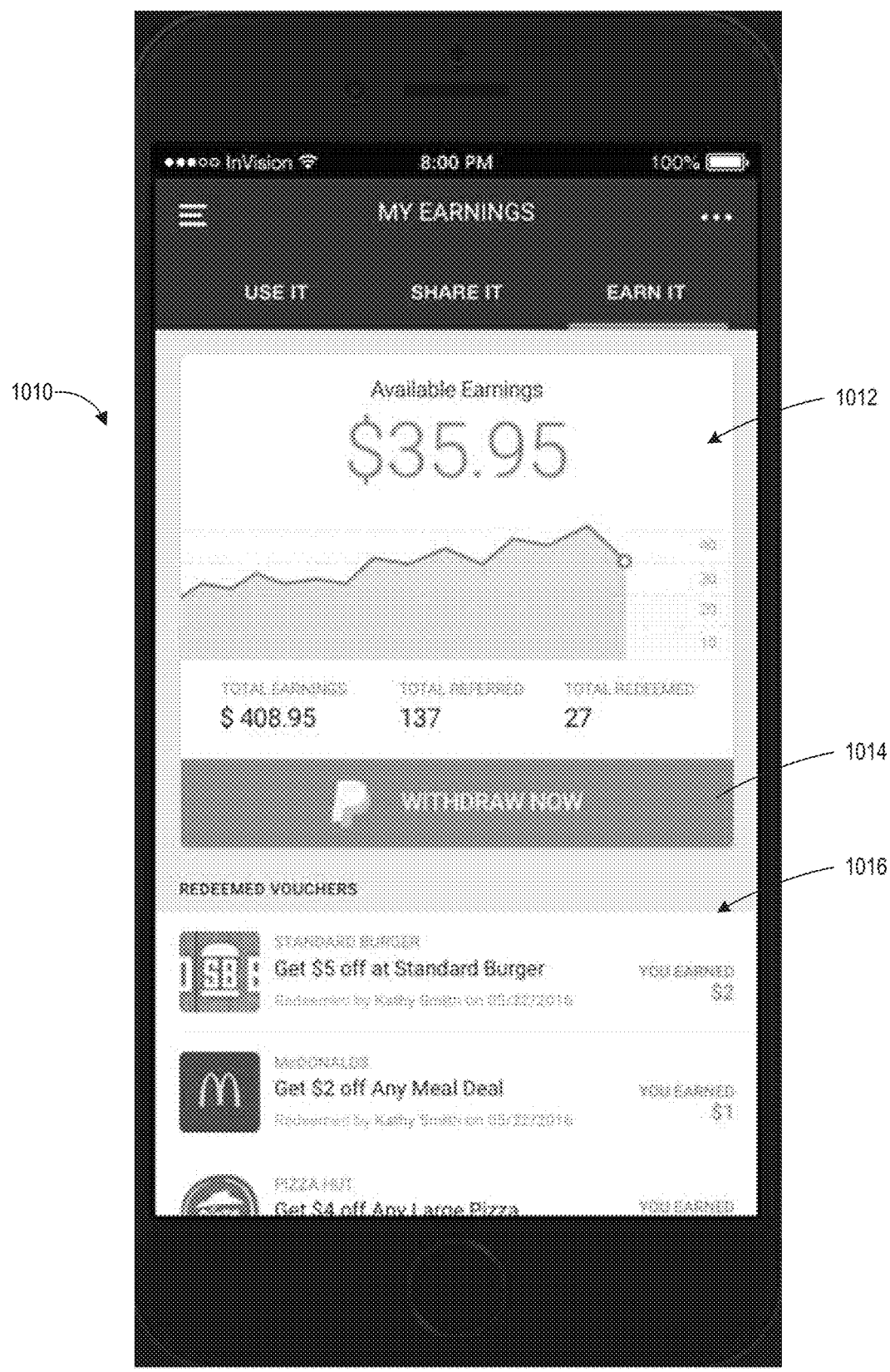
Figure 10B:
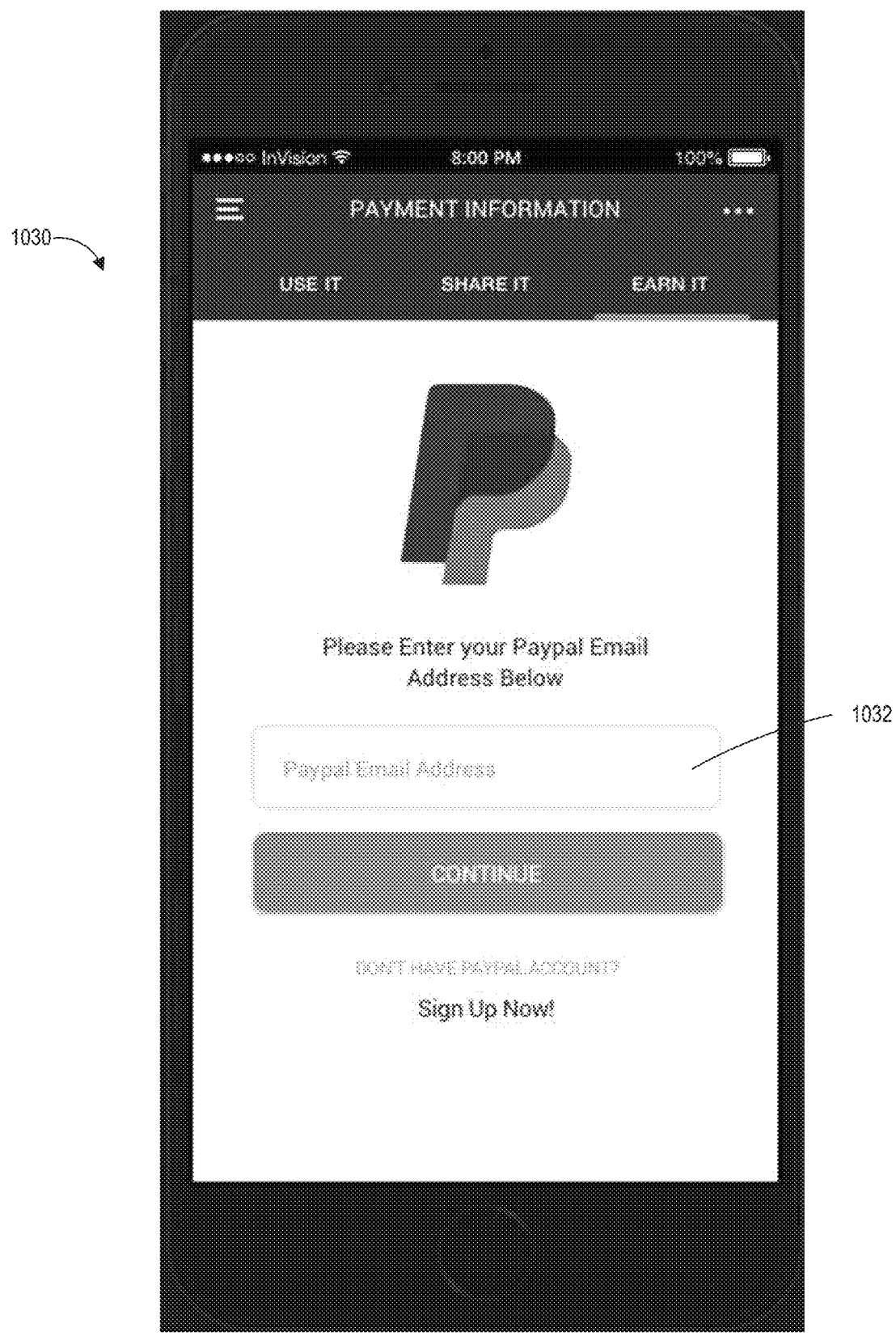
Figure 10C:
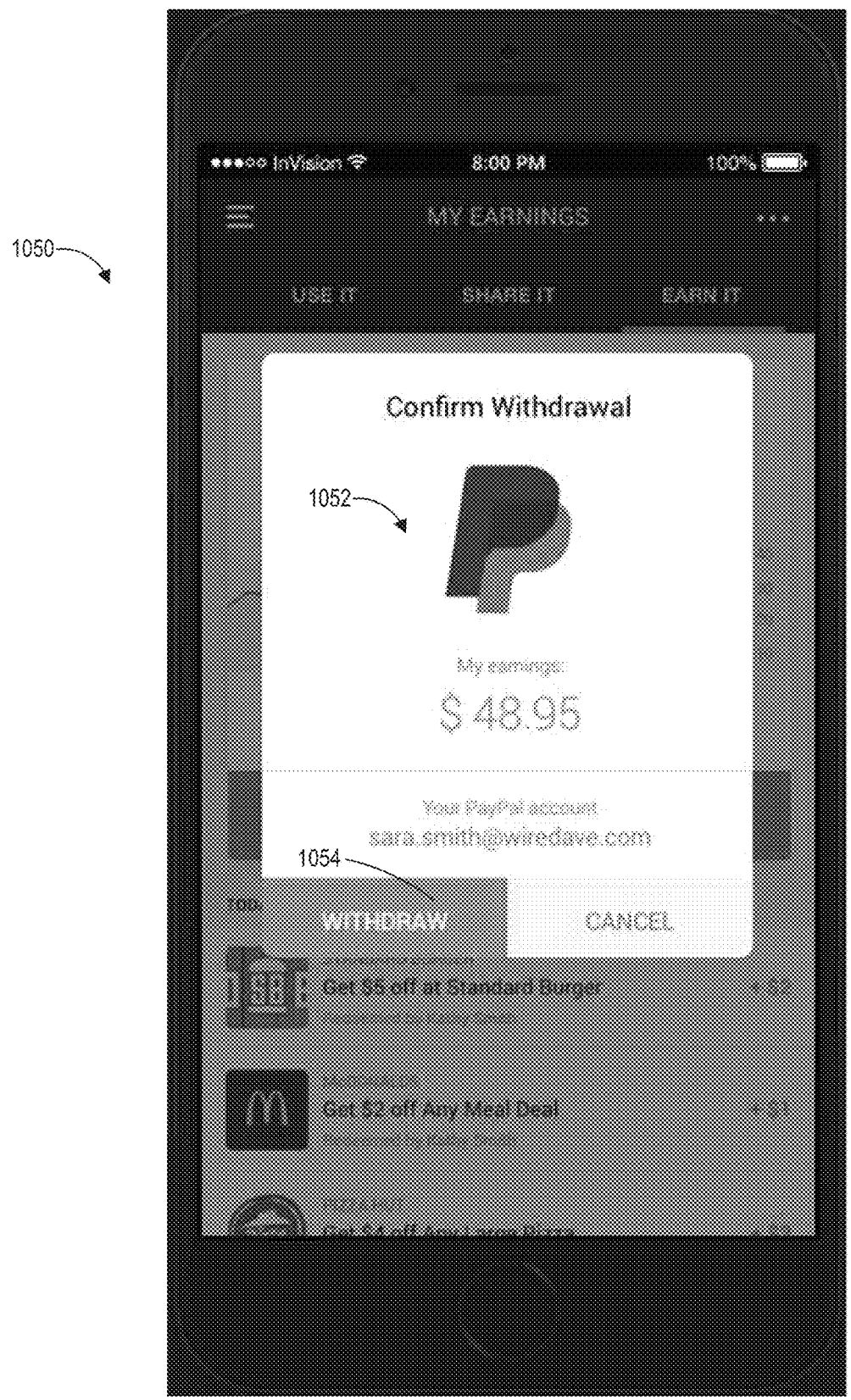

FIGS. 10A-10C illustrate example user interfaces for withdrawing earnings received from sharing offers. The user interface 1010 in FIG. 10A can show statistics associated with the user's earnings at the user interface element 1012. For example, the user interface element 1012 can present a curve for available earnings over a period of time. The user interface element 1012 can also show the total earnings, total number of referrals and total number of offers redeemed by other users. The user interface 1010 can further show the descriptions associated with offers redeemed by the other users at the user interface element 1016. For example, for each offer redeemed by another user, the user interface element 1016 can show which user has redeemed the offer, the amount of earnings from the other user's purchase, the date of redemption, the vendor's information, the type of discount, etc.

The user can withdraw at least a portion of the available earnings by actuating the user interface element 1014. When the user actuates the user interface element 1014, the referral system can present the user interface 1030 in FIG. 10B. In this example, the user can withdraw the earnings through his Paypal account. The user can input his email address 1032 associated with his Paypal account to start the withdrawal. The referral system can present the user interface 1050 in FIG. 10C prior to transferring the earnings from the user's account (of the referral application) to the Paypal account. The user interface 1050 can include a message 1052 which shows the earnings that the user is about to withdraw as well as the Paypal account to which the earnings will be transferred. The user can actuate the user interface button 1054 to confirm the withdrawal.

Example System Implementation and Architecture

Figure 11:
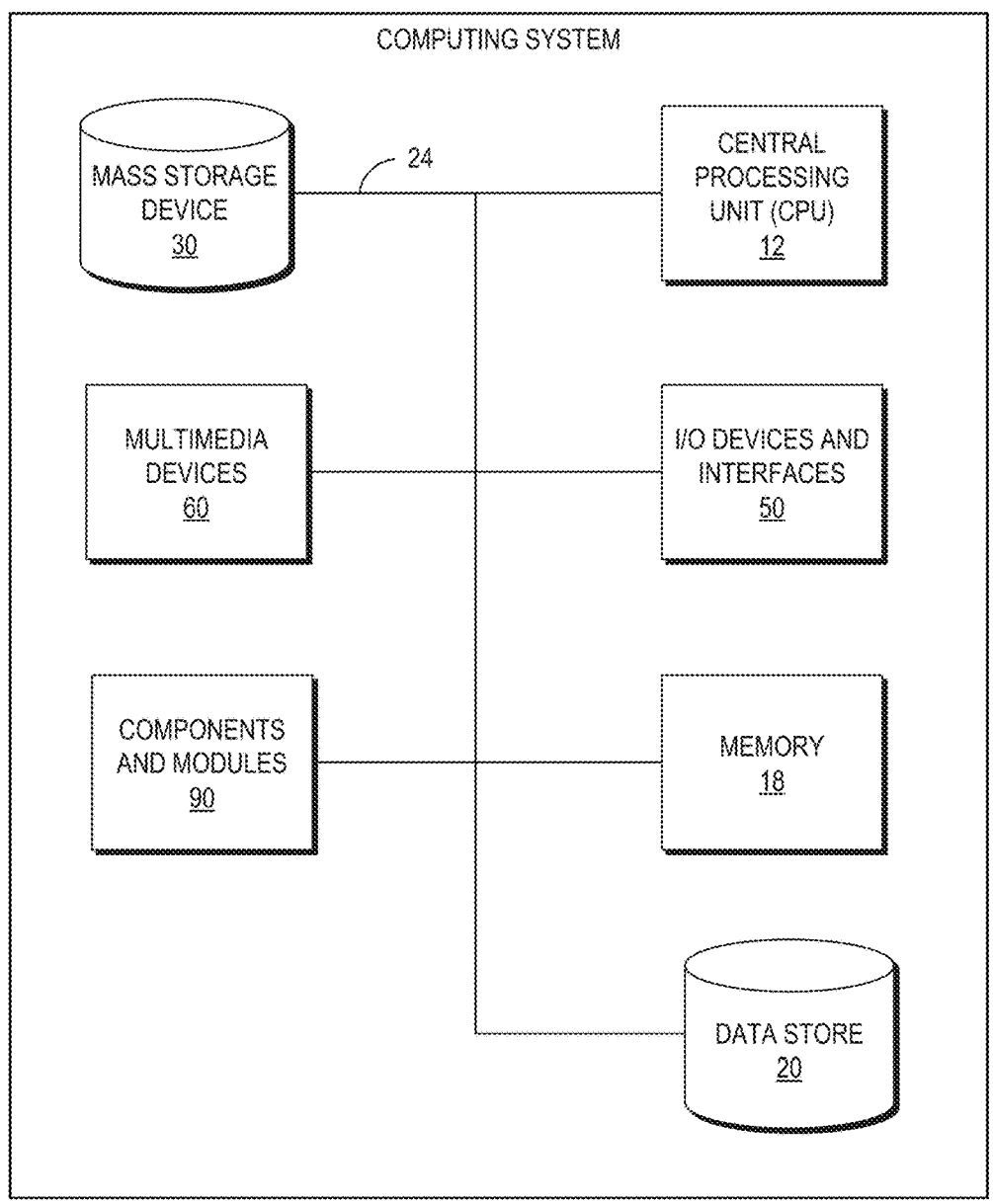
FIG. 11 illustrates a general architecture of a referral system that may implement various aspects of the present disclosure.

FIG. 11 illustrates a general architecture of a computing system for implementing various aspects of the present disclosure. Many or all of the components of the computing system shown in FIG. 11 may be included in the various computing devices and systems discussed herein. The computing system may include, for example, a personal computer (such as, for example, IBM, Macintosh, Microsoft Windows compatible, OS X compatible, Linux/Unix compatible, or other types of computing systems, alone or in combination), a server, a workstation, a laptop computer, a smart phone, a smart watch, a personal digital assistant, a kiosk, a car console, a tablet, or a media player. In one embodiment, the computing system's processing system 10 includes one or more central processing units ("CPU") 12, which may each include a conventional or proprietary microprocessor specially configured to perform, in whole or in part, one or more of the features described above. The processing system 10 further includes one or more memory 18, such as random access memory ("RAM") for temporary storage of information, one or more read only memory ("ROM") for permanent storage of information, and one or more mass storage device 30, such as a hard drive, diskette, solid state drive, or optical media storage device. A data store 20 may also be included. In some implementations, the data store 20 may be designed to handle large quantities of data and provide fast retrieval of the records. To facilitate efficient storage and retrieval, the data store 20 may be indexed using one or more of compressed data, identifiers, or other data, such as that described above.

Typically, the components of the processing system 10 are connected using a standards-based bus system 24. In different embodiments, the standards-based bus system 24 could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules 90 of processing system 10 may be combined into fewer components and modules or further separated into additional components and modules.

The processing system 10 is generally controlled and coordinated by operating system software, such as Windows XP, Windows Vista, Windows 7, Windows 8, Windows 10, Windows Server, Unix, Linux, SunOS, Solaris, iOS, MAC OS X, Blackberry OS, Android, or other operating systems. In other embodiments, the processing system 10 may be controlled by a proprietary operating system. The operating system is configured to control and schedule computer processes for execution, perform memory management, provide file system, networking, I/O services, and provide a user interface, such as a graphical user interface ("GUI"), among other things. The GUI may include an application interface and/or a web-based interface including data fields for receiving input signals or providing electronic information and/or for providing information to the user in response to any received input signals. A GUI may be implemented, in whole or in part, using technologies such as HTML, Flash, Java, .net, web services, and RSS. In some implementations, a GUI may be included in a stand-alone client (for example, thick client, fat client) configured to communicate (for example, send or receive data) in accordance with one or more of the aspects described.

The processing system 10 may include one or more commonly available input/output ("I/O") devices and interfaces 50, such as a keyboard, stylus, touch screen, mouse, touchpad, and printer. In one embodiment, the I/O devices and interfaces 50 include one or more display devices, such as a monitor, that allows the visual presentation of data to a user. More particularly, a display device provides for the presentation of GUIs, application software data, and multimedia presentations, for example. The processing system 10 may also include one or more multimedia devices 60, such as speakers, video cards, graphics accelerators, and microphones, for example.

In the embodiment of FIG. 11, the I/O devices and interfaces 50 provide a communication interface to various external devices. The processing system 10 may be electronically coupled to one or more networks (e.g., network 108), which comprise one or more of a LAN, WAN, cellular network, satellite network, and/or the Internet, for example, via a wired, wireless, or combination of wired and wireless communication link. The networks communicate with various computing devices and/or other electronic devices via wired or wireless communication links.

In some embodiments, information may be provided to the processing system 10 over a network from one or more data sources. The data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In general, the word "module," as used herein, refers to logic embodied in hardware or firmware, or to a collection of software instructions, possibly having entry and exit points, written in a programming language, such as, for example, Java, Lua, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts.

Software modules configured for execution on computing devices may be provided on a computer readable medium, such as a compact disc, digital video disc, flash drive, or any other tangible medium. Such software code may be stored, partially or fully, on a memory device of the executing computing device, such as the processing system 10, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules. They may be represented in hardware or firmware. Generally, the modules described herein refer to logical modules that may be combined with other modules or divided into sub-modules despite their physical organization or storage. The term "component" as used herein may have a similar meaning to a module.

In the example of FIG. 11, the components and modules 90 may be configured for execution by the CPU 12 to perform, in whole or in part, any or all of the process discussed above, such as those shown in FIGS. 1-10C. The processes may also be performed by one or more virtual machines. For example, the processes may be hosted by a cloud computing system. In certain implementations, one or more components of the processing system 10 may be part of the cloud computing system. Additionally or alternatively, the virtualization may be achieved at the operating system level. For example, the one or more processes described herein may be executed using application containerization. The one or more processes may also be implemented on a Lambda architecture designed to handle mass quantities of data by taking advantage of the batch processing and the stream processing.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. In some embodiments, at least some of the processes may be implemented using virtualization techniques such as, for example, cloud computing, application containerization, or Lambda architecture, etc., alone or in combination. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a virtual machine, a processing unit or processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer implemented method comprising:
receiving, by an input/output interface of a server an electronic request from a first user via an application executing on a first device, the electronic request to refer a vendor to a second user via an application executing on a second device, wherein the electronic referral request includes a unique code specifically identifying the vendor and the first user;
verifying, by a processor of the server that the first user associated with the first device is authorized to refer the vendor to the second user based on referring privilege information stored in a database in association with the first user, the process of verifying that the first user is authorized to refer the vendor including determining that the first user has previously completed a transaction with the vendor based on the vendor specific identifier and records stored in a database of the server;
generating, by a processor of the server an electronic referral code associated with the both the vendor and the first user when the first user is determined to be authorized and creating a temporary account for the second user associated with the second device when the second user does not have an account associated with the server;
sending, by an input/output interface of the server the electronic referral code to the second device for viewing by the second user via an application executing on the second device;
one of receiving, by an input/output interface of a vendor computing device the electronic referral code from the second user and capturing a graphical representation of the electronic referral code presented by a display screen of a device of the second user via an application executing on a vendor computing device;
sending, by an input/output interface of a vendor computing device to the server a request to verify the electronic referral code received from the second user is valid;
receiving, by an input/output interface of the server a request from application executing on a vendor computing device to verify the electronic referral code;
verifying, by a processor of the server the validity of the electronic referral code based on information stored in a database in association with second user; and
sending, by an input/output interface of the server a result of the verification of electronic referral code to an application executing on a vendor computing device.

2. The computer implemented method of claim 1, wherein the electronic offer code is a two-dimensional graphical code.

3. The computer implemented method of claim 1, wherein the electronic offer code is an alphanumeric string that includes encrypted representations of the first user identifier, vendor identifier, and offer parameters.

4. The computer implemented method of claim 1, wherein the electronic offer code is a number or alphanumeric string, and wherein the verifying the validity of the code comprises using the number or alphanumeric string to retrieve a user identifier and offer identifier associated with the electronic offer code in an electronic database of the server.

5. The computer implemented method of claim 1, wherein sending the code to the second mobile device comprises sending a uniform resource identifier that includes the code within the uniform resource identifier.

6. The computer implemented method of claim 1, wherein a processor of the server updates referral privilege information associated with the second user in a database to indicate that the second user is authorized to refer the vendor to other users via electronic requests when server receives an indication from an application executing on a vendor computing device that the second user has completed a transaction with the vendor.

7. The computer implemented method of claim 1, wherein the electronic offer code is a number or alphanumeric string and wherein the verification by a processor of the server of the validity of the alphanumeric string and its first user and vendor identifiers is based on records stored in a database of the server.

8. The computer implemented method of claim 1, wherein the electronic offer is communicated through a specific URL affiliate link containing the first user and vendor identifiers based on records stored in a database of a server.

9. The computer implemented method of claim 1, wherein a processor of the server updates sharing privilege information associated with the second user in a database to indicate that the second user is authorized to refer electronic offers redeemable from the vendor when server receives an indication from an application executing on a vendor computing device that the second user has completed a transaction with the vendor and the second user via an application executing on a device has created an account on the server.

10. The computer implemented method of claim 1, wherein a processor of the server updates offers usage information associated with the second user in a database to indicate that the second user has redeemed electronic offers from the vendor when the server receives an indication from an application executing on a vendor computing device that the second user has completed a transaction with the vendor via an application executing on a device.

11. The computer implemented method of claim 10, wherein verifying by a processor of the server the validity of the electronic offer code based on offer usage information associated with the second user stored in a database when the second user via an application executing on a device has not created an account on the server.

12. The computer implemented method of claim 11, wherein an electronic offer code is not determined to be valid by a processor of the server when the electronic offer usage information associated with the second user stored in a database indicates that the second user has redeemed a predetermined number of vendor specific electronic offers.

13. The computer implemented method of claim 11, wherein a processor of the server updates referral privilege information associated with the second user in a database to indicate that the second user is authorized to refer electronic offers redeemable from the vendor when the server receives an indication from an application executing on a vendor computing device that the second user has completed a transaction with the vendor via an application executing on a device and the second user via an application executing on a device has created an account on the server.

14. The computer implemented method of claim 11, wherein a processor of the server updates earnings for first user in a database to indicate that the first user has earned a reward when the server receives an indication from an application executing on a vendor computing device that the second user has completed a transaction with the vendor via an application executing on the second mobile device.

* * * * *